US010616401B2

(12) United States Patent
Tran et al.

(10) Patent No.: US 10,616,401 B2
(45) Date of Patent: *Apr. 7, 2020

(54) DEVICE AND METHOD FOR LOCKING IN BUTTON CONTEXT BASED ON A SOURCE CONTACT OF AN ELECTRONIC COMMUNICATION

(71) Applicant: MOTOROLA SOLUTIONS, INC., Chicago, IL (US)

(72) Inventors: Chi T. Tran, Wauwatosa, WI (US); Goktug Duman, Oakland Park, FL (US); Yunchen Huang, Plantation, FL (US)

(73) Assignee: MOTOROLA SOLUTIONS, INC., Chicago, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 15/874,945

(22) Filed: Jan. 19, 2018

(65) Prior Publication Data
US 2019/0230208 A1 Jul. 25, 2019

(51) Int. Cl.
*H04M 1/725* (2006.01)
*H04M 1/57* (2006.01)
(Continued)

(52) U.S. Cl.
CPC ........ *H04M 1/7258* (2013.01); *G06F 3/0484* (2013.01); *H04M 1/57* (2013.01);
(Continued)

(58) Field of Classification Search
CPC ........... H04M 1/7258; H04M 1/72569; H04M 1/72519; H04M 1/72597; H04M 1/57;
(Continued)

(56) References Cited

U.S. PATENT DOCUMENTS 5,894,276 A 4/1999 Altidor et al.
2004/0000898 A1 1/2004 Pool et al.
(Continued)

FOREIGN PATENT DOCUMENTS

CN 105511686 A 4/2016

OTHER PUBLICATIONS

ISA/EP, International Search Report and Written Opinion, dated Apr. 24, 2019, re PCT International Patent Application No. PCT/US2018/068176.
USPTO, Non-Final Rejection, dated Aug. 21, 2019, re U.S. Appl. No. 16/420,925.

*Primary Examiner* — Michael Y Mapa
(74) *Attorney, Agent, or Firm* — Perry + Currier, Inc.

(57) ABSTRACT

A device and method for locking in button context based on a source contact of an electronic communication is provided. An electronic communication is received, via a communication interface, from a source contact. A controller detects that button, of one or more buttons, has been activated, each of the one or more buttons mapped to activation of respective functions. The controller identifies a respective function mapped to the button. When the button is activated within a threshold time period after receiving the electronic communication, the controller performs the respective function using the source contact from which the electronic communication was received. When the button is activated after the threshold time period, the controller performs the respective function independent of the source contact.

20 Claims, 18 Drawing Sheets

(51) Int. Cl.
*G06F 3/0484* (2013.01)
*H04W 4/10* (2009.01)
*H04W 4/14* (2009.01)
*G06F 3/0488* (2013.01)

(52) U.S. Cl.
CPC ... *H04M 1/72519* (2013.01); *H04M 1/72569* (2013.01); *H04M 1/72597* (2013.01); *H04W 4/10* (2013.01); *G06F 3/0488* (2013.01); *H04W 4/14* (2013.01)

(58) Field of Classification Search
CPC ...... G06F 3/0484; G06F 3/0488; H04W 4/10; H04W 4/14
USPC .......... 455/403, 412.1–414.2, 418–420, 425, 455/456.1–457, 460, 550.1, 564–565, 455/575.1
See application file for complete search history.

(56) References Cited

U.S. PATENT DOCUMENTS

| | | |
|---|---|---|
| 2007/0015532 A1 | 1/2007 | Deelman |
| 2010/0239081 A1* | 9/2010 | Krantz ................ H04M 11/066 379/207.02 |
| 2011/0201379 A1 | 8/2011 | Jastram et al. |
| 2012/0315880 A1 | 12/2012 | Peitrow et al. |
| 2013/0086481 A1 | 4/2013 | Balasaygun et al. |
| 2013/0279681 A1 | 10/2013 | Weiner |
| 2014/0057610 A1* | 2/2014 | Olincy .................... H04W 4/16 455/414.1 |
| 2014/0379813 A1 | 12/2014 | Charania et al. |
| 2015/0290548 A1* | 10/2015 | Meyers .................... A63H 3/28 446/397 |
| 2019/0281150 A1* | 9/2019 | Tran ................. H04M 1/72569 |

* cited by examiner

| GIVEN PATTERN | PUSH-TO-TALK FUNCTION (BUTTON 132-1) | MESSAGING FUNCTION (BUTTON 132-2) | PRIVATE CALL FUNCTION (BUTTON 132-3) | POSITIONING FUNCTION (BUTTON 132-4) |
|---|---|---|---|---|
| ACTIVATION OF BUTTONS 132 DURING THRESHOLD TIME PERIOD — SHORT PRESS | ANNOUNCE A MISSED PTT CALL | PLAY AND TOGGLE TO A NEXT UNREAD MESSAGE | ANNOUNCE A MISSED PRIVATE CALL AND/OR TELEPHONE CALL | LOCATE A CURRENT CONTACT ON A MAP |
| DOUBLE PRESS | N/A | REPLAY MESSAGE FROM BEGINNING | N/A | N/A |
| LONG PRESS | PTT CALL TO CURRENT CONTACT | INITIATE MESSAGE (AND/OR A REPLY) TO A CURRENT CONTACT | INITIATE PRIVATE CALL (AND/OR A CALL BACK) TO A CURRENT CONTACT | PROVIDE ROUTE DIRECTIONS TO A CURRENT CONTACT |
| ACTIVATION OF BUTTONS 132 AFTER THRESHOLD TIME PERIOD — LONG PRESS | NO SELECTED CONTACT: RECEIVE CONTACT INFORMATION VIA MICROPHONE | NO SELECTED CONTACT: RECEIVE CONTACT INFORMATION VIA MICROPHONE | NO SELECTED CONTACT: RECEIVE CONTACT INFORMATION VIA MICROPHONE | NO SELECTED CONTACT: RECEIVE CONTACT INFORMATION AND/OR LOCATION VIA MICROPHONE |
| ACTIVATION OF MICROPHONE ACTIVATION BUTTONS 133 — SHORT PRESS | ABORT/CANCEL/HOME/RESTART | | | |
| LONG PRESS | RECEIVE CONTACT INFORMATION VIA MICROPHONE | | | |

DEVICE AND METHOD FOR LOCKING IN BUTTON CONTEXT BASED ON A SOURCE CONTACT OF AN ELECTRONIC COMMUNICATION

BACKGROUND OF THE INVENTION

Operation of radio and/or mobile devices by public safety personnel, such as police officers and the like, may be challenging in critical situations. For example, such public safety personnel may simultaneously be attempting to manage crowds, erratic individuals and/or dangerous environments, as well as operating a mobile device. Many mobile devices are tending towards inclusion of touchscreens to operate the mobile devices, which generally require visual attention, as well as cognitive and physical resources of public safety personnel interacting with a touchscreen.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 18 depicts a table defining different modes performed for the buttons when activated according to given patterns in accordance with some embodiments.

Figure 1:
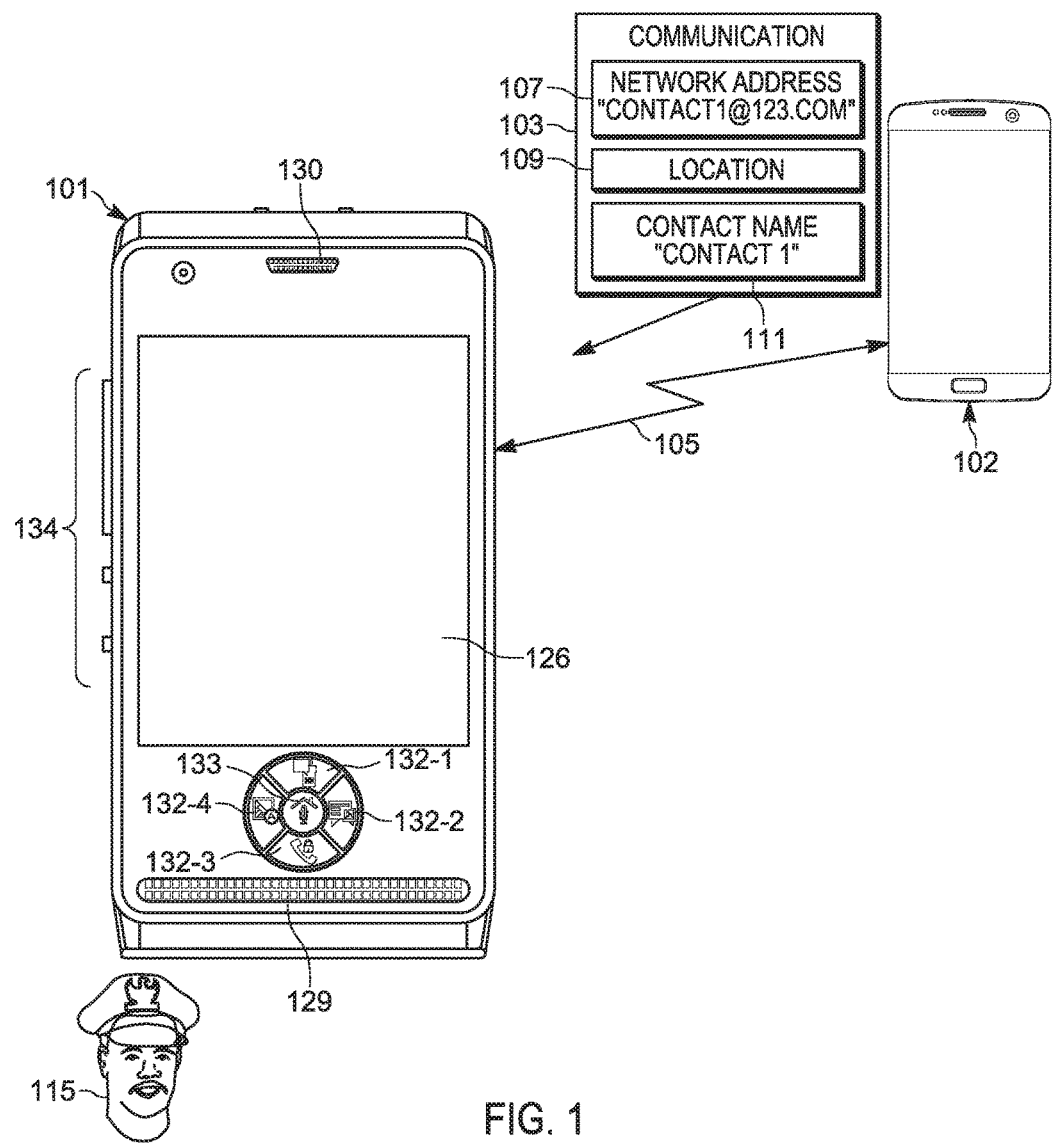
FIG. 1 is a perspective view of a device configured for locking in button context based on a source contact of an electronic communication in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Operation of radio and/or mobile devices by public safety personnel, such as police officers and the like, may be challenging in critical situations. For example, such public safety personnel may simultaneously be attempting to manage crowds, erratic individuals and/or dangerous environments, as well as operating a mobile device. Many mobile devices are tending towards inclusion of touchscreens to operate the mobile devices, which generally require visual attention, as well as cognitive and physical resources of public safety personnel interacting with a touchscreen. Distraction by the public safety personnel may hence lead to incorrect operation of the mobile device, which can waste computing and/or radio resources at the mobile device, as well as potentially cause issues in critical situations.

An aspect of the specification provides a device comprising: a communication interface; one or more buttons, each mapped to activation of respective functions; and a controller configured to: receive, via the communication interface, an electronic communication from a source contact; detect that a button, of the one or more buttons, has been activated; identify a respective function mapped to the button; when the button is activated within a threshold time period after receiving the electronic communication, perform the respective function using the source contact from which the electronic communication was received; and when the button is activated after the threshold time period, perform the respective function independent of the source contact.

Another aspect of the specification provides a method comprising: receiving, via a communication interface, an electronic communication from a source contact; detecting, via a controller, that a button, of one or more buttons, has been activated, each of the one or more buttons mapped to activation of respective functions; identifying, via the controller, a respective function mapped to the button; when the button is activated within a threshold time period after receiving the electronic communication, performing, via the controller, the respective function using the source contact from which the electronic communication was received; and when the button is activated after the threshold time period, performing, via the controller, the respective function independent of the source contact.

Figure 2:
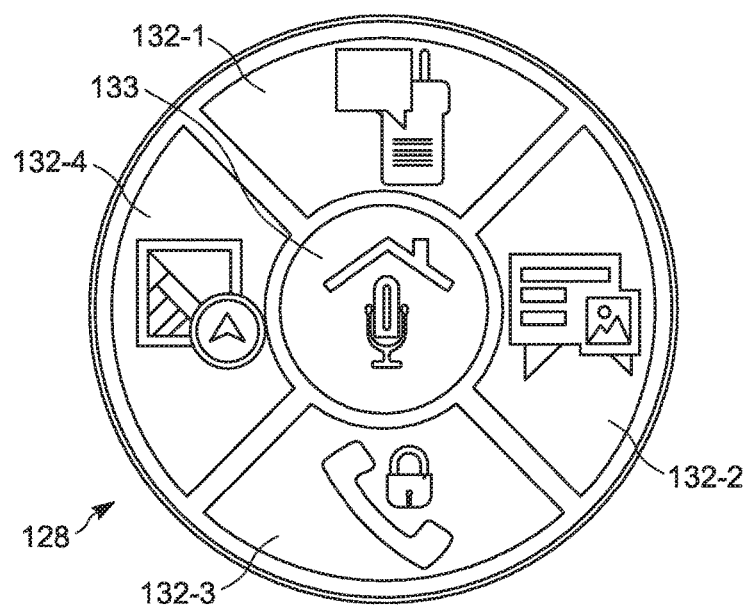
FIG. 2 depicts details of buttons of the device of FIG. 1 in accordance with some embodiments.
Figure 3:
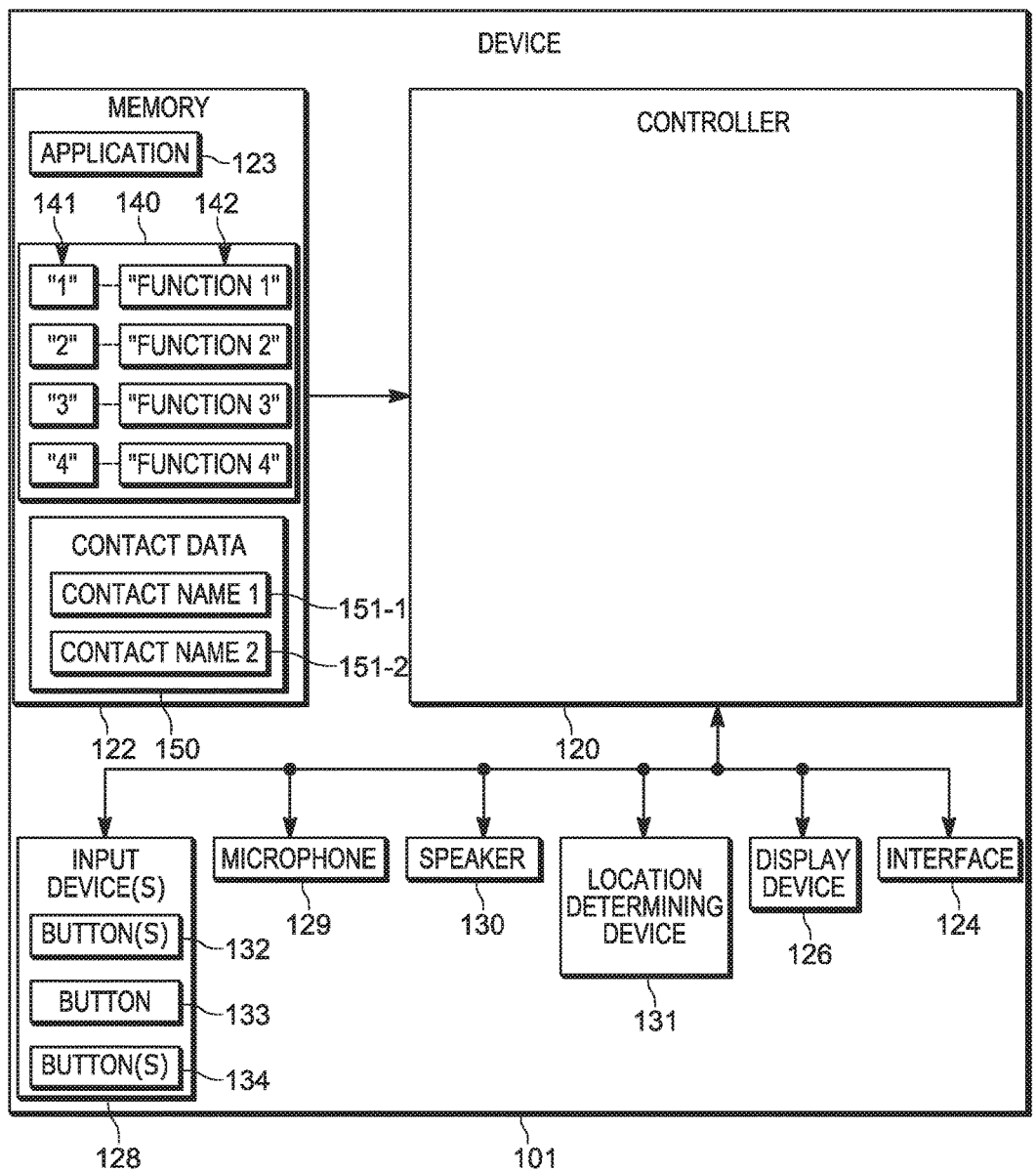
FIG. 3 is a schematic diagram of the device of FIG. 1 in accordance with some embodiments.

Attention is directed to FIG. 1, which depicts a perspective view of a device 101, FIG. 2, which depicts details of buttons of the device 101, and FIG. 3 which depicts a schematic block diagram of the device 101. In FIG. 1, the device 101 is further depicted as being in communication with a second device 102, and specifically as receiving an example electronic communication 103 from the device 102 via a communication link 105. As depicted, the example electronic communication 103 includes a network address 107 (e.g. of the device 102, for example, an Internet Protocol (IP) address, an email address, a telephone number, a radio talkgroup identifier and the like), an optional location 109 of the device 102, and an optional contact name 111 associated with the device 102. The contact name 111 may include a name of a person associated with the device 102 (e.g. a natural name, a given name, an alias, and the like). As depicted, the network address 107 comprises an email address, "contact1@123.com", and the contact name 111 is depicted as text "Contact 1". The electronic communication 103 may be referred to as being received from a source contact, the source contact defined by one or more of: a network address of the device 102; an IP address of the device 102; a telephone number of the device 102; a talkgroup identifier associated with the device 102; an email address of the device 102; a name of a person associated with the device 102; and/or any data received in the electronic communication 103 identifying the device 102 and/or a user and/or person associated with the device 102, and the like. While the electronic communication 103 is depicted with a particular example format, the electronic communication 103 may comprise one or more of a telephone call, a missed telephone call, a push-to-talk call (e.g. in talkgroup), a missed push-to-talk call a voicemail, a playable message (e.g. that may include playable video and/or playable audio), an email, a text message, a short message service (SMS) message, a multimedia messaging service (MMS) message, a push-to-talk (PTT) message, and the like, with a format corresponding to a type of the electronic communication 103.

As depicted, the device 101 is further associated with, and/or operated by, a responder 115. For example, as depicted, the responder 115 is a police officer. However, the device 101 may be associated with, and/or operated by, other types of responders and/or other types of public safety personnel including, but not limited to, fire responders, emergency medical responders, and the like. Indeed, the device 101 may alternatively be associated with, and/or operated by, non-responders and/or non-public safety personnel, such as members of the public and/or persons associated with business entities.

With reference to FIG. 1, FIG. 2 and FIG. 3, the device 101 includes: a controller 120, a memory 122 (storing an application 123), a communication interface 124 (interchangeably referred to the interface 124), a display device 126, at least one input device 128, a microphone 129, a speaker 130, and a location determining device 131. As depicted, the at least one input device 128, includes one or more buttons 132; for example, as depicted in FIG. 1 and FIG. 2, the at least one input device 128 includes four buttons 132-1, 132-2, 132-3, 132-4, each mapped to activation of respective functions. As depicted, the at least one input device 128 includes an optional voice activation button 133 configured to activate the microphone 129 to receive contact information, as described in more detail below. With reference to FIG. 1, the input device 128 may include one or more further buttons 134 located along one or more edges of the device 101, and the like, for example for turning the device 101 on and off, controlling volume, and the like.

Furthermore, while the term "buttons" is used to describe the buttons 132, button 133, the term "button" and/or "buttons" as described herein may include any physical and/or hardware controls and/or input devices which may be tactilely identified by a user in an eyes-free/heads-up manner, and used to activate respective functions. For example, such buttons may include, but are not limited to, switches, toggles, depressible knobs, touchscreens with haptic feedback (e.g. that enable a user to "feel" texture of specific regions of a touchscreen), and the like.

Furthermore, while the buttons 132,133, are depicted in FIG. 1 as being located at a front of the device 101, adjacent the display device 126, the buttons 132,133, may be located anywhere on a housing of the device 101, for example on a rear of the device 101, on a side of the device 101 and/or an edge of the device 101, and the like, including, but not limited to, adjacent the buttons 134.

As best seen in FIG. 2, the buttons 132 may be arranged in a circular arrangement around the voice activation button 133. However, the buttons 132, 133 may be arranged in any manner, including, but not limited to, in a row, and the like. However, the buttons 132, 133 may be configured and/or arranged to provide a tactile indication of their location and/or their respective functionality to at least distinguish the button 133 from the buttons 132. For example, as depicted, a user of the device 101, such as the responder 115, attempting to locate the buttons 132, 133 may distinguish the button 133 from the buttons 132 in an eyes-free/heads-up manner, as the button 133 is located in the middle of the circular arrangement of buttons 132. Alternatively, the buttons 132, 133 may be configured with different tactile textures, and the like which may be used by the responder 115 to identify the buttons 132, 133 using touch, an eyes-free/heads-up manner.

Furthermore, each of the buttons 132 is mapped to activation of respective functions. Such respective functions may be configurable using a menu system, and the like, and/or one or more of the buttons 132 may be dedicated to a given respective function. Regardless, the respective functions may include, but are not limited to, one or more of: a messaging function, an e-mail function, a push-to-talk function, a private call function, an incident management function, a video streaming function, and a positioning function. In particular, each of the functions may be performed using contact information, including, but not limited to, contact information of the source contact from which the electronic communication 103 was received.

For example, the button 132-1 may be used to activate a push-to-talk function to a source contact, the button 132-2 may be used to activate a messaging function (e.g. an email function and/or a text function) using a source contact, the button 132-3 may be used activate a private call function to a source contact, and the button 132-4 may be used to activate a positioning function using a source contact.

Furthermore, the locations of each of the buttons 132 relative to the button 133 (e.g. and a housing of the device 101), may indicate their respective functionality to a user (e.g. the responder 115) in an eyes-free/heads-up manner, at least once a user is trained with regards to their respective functions. For example, the button 132-1 is located in an "upper" position, the button 132-2 is located in a "right" position, the button 132-3 is located in a "lower" position, and the button 132-4 is located in a "left" position, all relative to the button 133, a housing of the device 101 and/or each other.

Furthermore, as also best seen in FIG. 2, each button 132 may be provided with an icon (e.g. a printed icon) indicative of a respective functionality; in some embodiments, such icons may be provided with tactile features to distinguish each button 132 from each other.

As depicted, the device 101 generally comprises a mobile device which includes, but is not limited to, any suitable combination of electronic devices, communication devices, computing devices, portable electronic devices, mobile computing devices, portable computing devices, tablet computing devices, laptop computers, telephones, PDAs (personal digital assistants), cellphones, smartphones, e-readers, mobile camera devices and the like. Other suitable devices are within the scope of present embodiments including non-mobile devices, any suitable combination of work stations, servers, personal computers, dispatch terminals, operator terminals in a dispatch center, and the like.

In some embodiments, the device 101 is specifically adapted for use as a public safety device and may be deployed and/or managed by a public safety and/or first responder agency including, but not limited to, police organizations, health organizations, intelligence organizations, military organizations, government organizations, and the like.

Indeed, in some embodiments, the device 101 is specifically adapted for emergency service radio functionality, and the like, used by emergency responders, including, but not limited to, police service responders, fire service responders, emergency medical service responders, and the like.

In some of these embodiments, the device 101 further includes other types of hardware for emergency service radio functionality, including, but not limited to, push-to-talk ("PTT") functionality. In some of these embodiments, embodiments, the device 101 may comprise a radio device that includes remote speaker microphone (RSM), for example as may be used by public safety agencies; and one or more of the buttons 132, 133 may be incorporated into the remote speaker microphone.

However, the device 101 may further be adapted for use as a consumer device and/or business device, and the like, and/or may include additional or alternative components related to, for example, telephony, messaging, entertainment, and/or any other components that may be used with computing devices and/or communication devices.

The device 102, while not described in detail, may be similar to the device 101, and may also be associated with a responder and/or managed by a public safety agency; however, the device 102 may alternatively be a consumer device and/or a business device.

With reference to FIG. 3, the controller 120 includes one or more logic circuits, one or more processors, one or more microprocessors, one or more ASIC (application-specific integrated circuits) and one or more FPGA (field-programmable gate arrays). In some embodiments, the controller 120 and/or the device 101 is not a generic controller and/or a generic device, but a device specifically configured to implement functionality for locking in button context based on: a source contact of an electronic communication and/or contact information received from a microphone (e.g. when the optional button 133 is present). For example, in some embodiments, the device 101 and/or the controller 120 specifically comprises a computer executable engine configured to implement specific functionality for locking in button context based on: a source contact of an electronic communication and/or contact information received from a microphone (e.g. when the optional button 133 is present).

The memory 122 is a machine readable medium that stores machine readable instructions to implement one or more programs or applications. Example machine readable media include a non-volatile storage unit (e.g. Erasable Electronic Programmable Read Only Memory ("EEPROM"), Flash Memory) and/or a volatile storage unit (e.g. random-access memory ("RAM")). In the embodiment of FIG. 3, programming instructions (e.g., machine readable instructions) that implement the functional teachings of the device 101 as described herein are maintained, persistently, at the memory 122 and used by the controller 120 which makes appropriate utilization of volatile storage during the execution of such programming instructions.

In particular, the memory 122 of FIG. 3 stores instructions corresponding to the application 123 that, when executed by the controller 120, enables the controller 120 to implement functionality for locking in button context based on a source contact of an electronic communication. In illustrated examples, when the controller 120 executes the application 123, the controller 120 is enabled to: receive, via the communication interface 124, an electronic communication from a source contact; detect that a button 132, of the one or more buttons 132, has been activated; identify a respective function mapped to the button 132; when the button 132 is activated within a threshold time period after receiving the electronic communication, perform the respective function using the source contact from which the electronic communication was received; and when the button 132 is activated after the threshold time period, perform the respective function independent of the source contact.

Execution of the application 123 by the controller 120 may further enable the controller to implement functionality for locking in button context based on contact information received from a microphone assuming, for example, that the optional voice activation button 133 is present at the device 101. In illustrated examples, when the controller 120 executes the application 123, the controller 120 is further enabled to: detect that the voice activation button 133 is activated; receive, via the microphone 129, contact information; detect that a button 132, of the one or more buttons 132, has been activated; identify a respective function mapped to the button 132; when the button 132 is activated within a threshold time period after activation of the voice activation button 133, perform the respective function using the contact information received via the microphone 129; and when the button 132 is activated after the threshold time period, perform the respective function independent of the contact information.

As depicted in FIG. 3, the memory 122 may further store a mapping 140 between the one or more buttons 132 and their respective functions. The mapping 140 may comprise a look-up table, a database, and the like. For example, as depicted, the mapping 140 includes an identifier 141 of each of the one or more buttons 132 (e.g. "1" for the button 132-1, "2" for the button 132-2, "3" for the button 132-3, and "4" for the button 132-4). Each identifier 141 is mapped to a respective function, for example instructions 142, and the like, for activating the respective function, which may be used to call and/or implement the respective function at the controller 120. The association is represented in FIG. 3 by a respective dashed line between an identifier 141 and associated instruction 142. Each of the instructions 142 is identified in the example mapping 140 using respective text "Function1", "Function 2", "Function 3", "Function 4".

For example, instructions 142 for "Function 1", mapped to the button 132-1, may comprise instructions for activating a push-to-talk function to a source contact, which may include, but is not limited to, activating a push-to-talk function to a talk group associated with the source contact (e.g. a push-to-talk group call to a talk group that includes the source contact and/or a talk group identified in relation to the source contact). Similarly, instructions 142 for "Function 2", mapped to the button 132-2, may comprise instructions for activating a messaging function using a source contact. Similarly, instructions 142 for "Function 3", mapped to the button 132-3, may comprise instructions for activating a private call function (e.g. a telephone function) to a source contact. Similarly, instructions 142 for "Function 4", mapped to the button 132-4, may comprise instructions for activating a positioning function using a source contact.

Furthermore, the respective function for each button 132 may be configurable using, for example, a menu system, and the like, at the device 101. In these embodiments, the instructions 142 may be changed and/or updated when a button 132 is changed to activate a different respective function.

In other embodiments, one or more of the buttons 132 may be dedicated to a given respective function; in these embodiments, the mapping 140 may be optional, as each button 132 dedicated to a given respective function may be hardwired, and the like, for performing the given respective function, and/or instructions for performing the given respective function may be embedded in operating instructions for the device 101 and not configurable.

Furthermore, the instructions 142 in the mapping 140 may alternatively be replaced with an identifier of a respective function, which may be used to execute the respective function, for example using applications (not depicted) for implementing the respective functions which may be stored at the memory 122.

As depicted, the memory 122 may further store contact data 150 which may include, but is not limited to, an electronic address book, and the like. As such, the contact data 150 stores contact name data 151-1, 151-2, and the like. The contact name data 151-1, 151-2 will be interchangeably referred to hereafter, collectively, and generically, as contact name data 151. While two sets of contact name data 151 are depicted in the example embodiment (e.g. "Contact Name 1", and "Contact Name 2"), the contact data 150 may store any number of sets of contact name data 151.

It will be assumed hereafter that the contact name data 151-1 stores information associated with the device 102, and/or the contact name 111, and may include information similar to the information received in the electronic communication 103.

It will be further assumed hereafter that the contact name data 151-2 stores information associated with a device and/or contact name different from the device 102 and/or the contact name 111.

Each set of contact name data 151 may include contact information for a contact and/or a source contact and/or contact name that includes, but is not limited to, one or more of: a network address of a device associated with a respective contact, an IP address of the device associated with the respective contact, a telephone number of the device associated with the respective contact, a radio talkgroup identifier associated with the device that is associated with the respective contact, an email address of the device associated with the respective contact, and a name (e.g. a natural name, a given name, an alias, and the like) of the respective contact.

Indeed, using information received in the electronic communication 103, further information associated with the source contact (e.g. information not received with the electronic communication 103) may be retrieved from the contact name data 151-1. For example, when the electronic communication 103 does not include a telephone number and/or a talkgroup identifier of the source contact (e.g. of the device 102), but the electronic communication 103 includes a name of the source contact (e.g. contact name 111) that is also stored in the contact name data 151-1, the telephone number and/or the talkgroup identifier of the source contact may be retrieved from the contact name data 151-1 using the name of the source contact received in the electronic communication 103.

The interface 124 is generally configured to communicate via the link 105 which may include one or more of wired and/or wireless links as desired, including, but not limited to, cables, WiFi links and the like. In other words, the interface 124 is enabled to communicate using any suitable combination of wired networks and/or wireless networks. The interface 124 may be implemented by, for example, one or more radios and/or connectors and/or network adaptors, configured to communicate wirelessly, with network architecture that is used to implement the link 105. In some embodiments, the interface 124 includes, but is not limited to, one or more broadband and/or narrowband transceivers, such as a Long Term Evolution (LTE) transceiver, a Third Generation (3G) (3GGP or 3GGP2) transceiver, an Association of Public Safety Communication Officials (APCO) Project 25 (P25) transceiver, a Digital Mobile Radio (DMR) transceiver, a Terrestrial Trunked Radio (TETRA) transceiver, a Worldwide Interoperability for Microwave Access (WiMAX) transceiver operating in accordance with an IEEE 802.16 standard, and/or other similar type of wireless transceiver configurable to communicate via a wireless network for infrastructure communications. In yet further embodiments, the interface 124 includes one or more local area network or personal area network transceivers operating in accordance with an IEEE 802.11 standard (e.g., 802.11a, 802.11b, 802.11g), or a Bluetooth™ transceiver. In some embodiments, the interface 124 is further configured to communicate "radio-to-radio" on some communication channels, while other communication channels are configured to use wireless network infrastructure. Example communication channels over which the interface 124 may be generally configured to wirelessly communicate include, but are not limited to, one or more of wireless channels, cellphone channels, cellular network channels, packet-based channels, analog network channels, Voice-Over-Internet ("VoIP"), push-to-talk channels and the like, and/or a combination. Indeed, the term "channel" and/or "communication channel", as used herein, includes, but is not limited to, a physical radio-frequency (RF) communication channel, a logical radio-frequency communication channel, a non-trunking talkgroup and/or a trunking talkgroup (interchangeably referred to here as a "talkgroup"), a non-trunking announcement group, a trunking announcement group, a VOIP communication path, a push-to-talk channel, and the like.

The display device 126 comprises any suitable one of, or combination of, flat panel displays (e.g. LCD (liquid crystal display), plasma displays, OLED (organic light emitting diode) displays), touchscreen displays and the like.

While not depicted, the device 101 may include other input devices 128, in addition to buttons 132, 133, 134, including, but not limited to, pointing devices, touchpads, buttons, keyboards, and the like.

The microphone 129 is generally configured to receive voice commands, voice interactions, and the like from the responder 115, and the like, including, but not limited to, contact information corresponding to information stored in the contact name data 151.

The speaker 130 is generally configured to provide audio functionality of the device 101, including, but not limited to, telephonic functionality, push-to-talk functionality, and the like. Furthermore, the speaker 130 may be used when implementing text-to-speech functionality of the device 101, as described in more detail below.

The location determining device 131 may include one or more of a Global Positioning System (GPS) device, a triangulation device, and the like.

Furthermore, one or more components of the device 101, such as the display device 126, the input devices 128 (including one or of more of the buttons 132, 133, 134), the microphone 129 and the speaker 130, may be external to the device 101 and accessible to the device 101 via the interface 124. For example, one or more of the buttons 132, 133, 134, the microphone 129 and the speaker 130 may be incorporated into a remote speaker microphone (not depicted), and the like, of the device 101. Similarly, device 101 may comprise a laptop computer and/or a personal computer, and the display device 126 and/or one or more of the input devices 128 (e.g. such as a keyboard and/or a pointing device) may be external to the laptop computer and/or the personal computer.

While not depicted, the device 101 may further include a battery and/or a power supply and/or a connection to a mains power supply and/or one or more lights and/or one or more haptic devices and/or one or more notification devices. For example, the device 101 may further comprise a clock device for tracking time, for example to determine whether activation of buttons 132, 133 occur within a threshold time period and/or after a threshold time period; such a clock device may include, but is not limited to, a clock device of the controller 120 and/or a clock device of a hardware processor of the controller 120.

In any event, it should be understood that a wide variety of configurations for the device 101 are within the scope of present embodiments.

While example embodiments of the device 101 described with reference to FIG. 1, FIG. 2 and FIG. 3 include four buttons 132, in other embodiments, devices configured for locking in button context based on one or more of a source contact of an electronic communication and contact information received at a microphone, as described herein, may include as few as one button 132.

Figure 4:
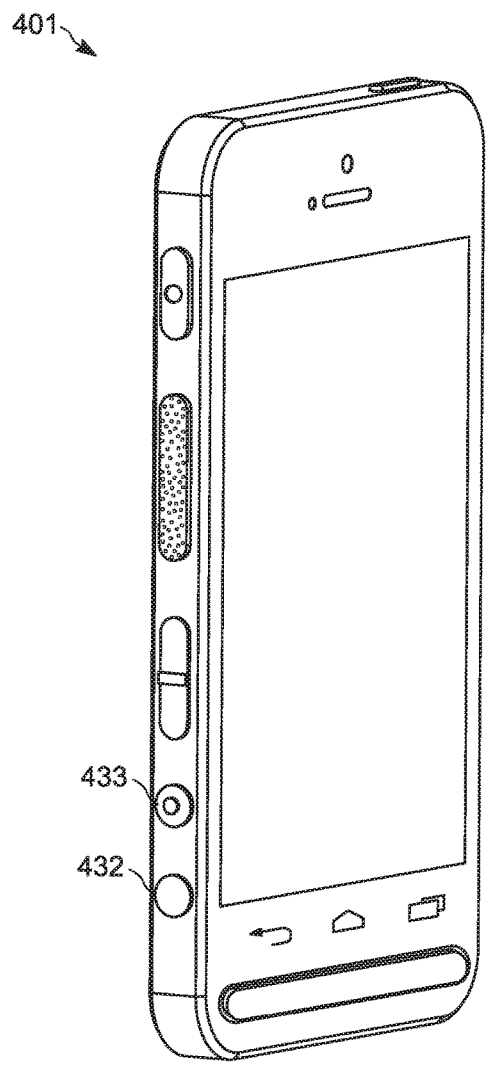
FIG. 4 is a perspective view of an alternative device configured for locking in button context based on a source contact of an electronic communication in accordance with some embodiments.

For example, attention is directed to FIG. 4, which depicts a perspective view of a device 401, that is substantially similar to the device 101. While not depicted, it is assumed that the device 401 includes similar components to the device 101, including, but not limited to, a controller, a memory, a communication interface, a microphone, etc. However, the device 401 includes one button 432 located along a side and/or an edge of the device 401, which is mapped to a respective function, and is otherwise similar to the buttons 132. As there is only one button 432 at the device 401 (as compared to four buttons 132 at the device 101), the respective function of the button 432 may be configurable, for example using a menu system, and the like. However, the button 432 may alternatively be dedicated to a given respective function.

Furthermore, the device 401 includes a voice activation button 433, adjacent the button 432, and located along the same side and/or same edge of the device 401 as the button 432. The voice activation button 433 is otherwise similar to the button 133. As depicted, the button 433 includes a tactile texture (e.g. in the form of a raised portion) different from a tactile texture of the button 432; hence, a user of the device 401, such as the responder 115, and the like, may distinguish the buttons 432, 433 from each other in an eyes-free/heads-up manner. However, the relative locations of the buttons 432, 433 on a housing of the device 401 may also enable a user of the device 401 to distinguish the buttons 432, 433 from each other in an eyes-free/heads-up manner.

Figure 5:
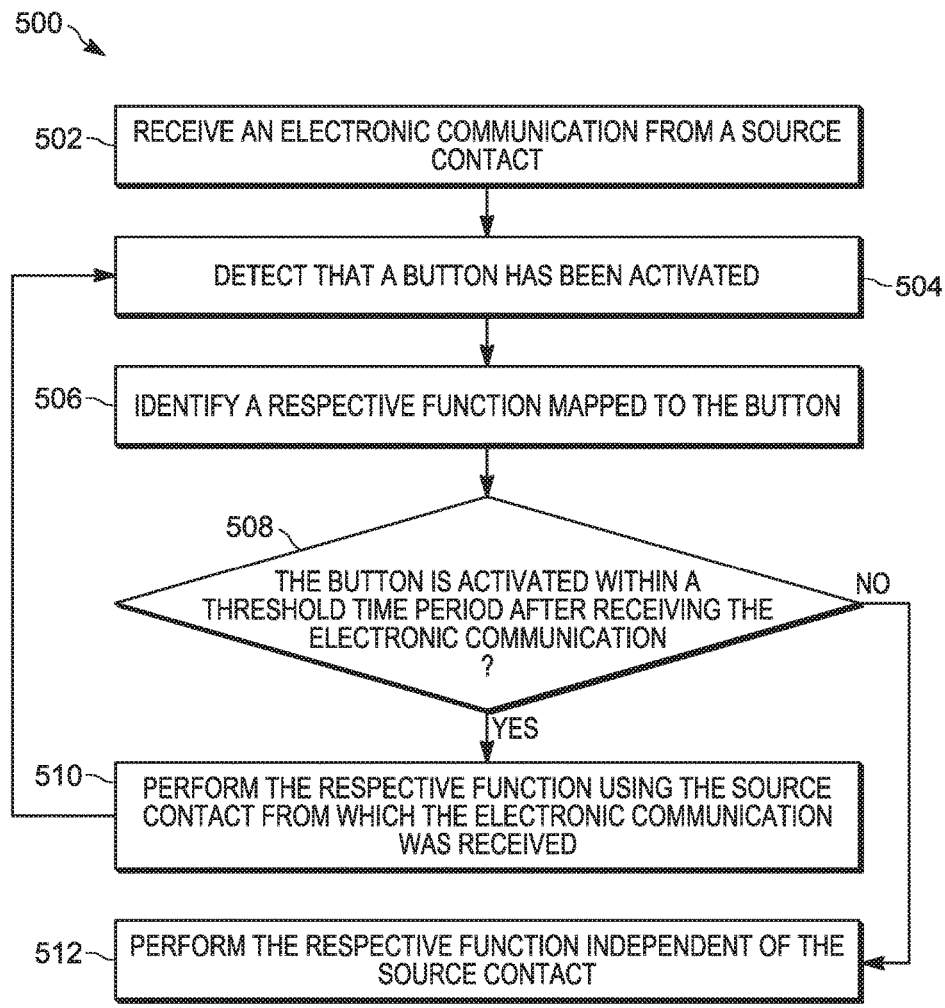
FIG. 5 is a flowchart of a method for locking in button context based on a source contact of an electronic communication in accordance with some embodiments.

Attention is now directed to FIG. 5 which depicts a flowchart representative of a method 500 for locking in button context based on a source contact of an electronic communication. In some embodiments, the operations of the method 500 of FIG. 5 correspond to machine readable instructions that are executed by, for example, the device 101, and specifically by the controller 120 of the device 101. In the illustrated example, the instructions represented by the blocks of FIG. 5 are stored at the memory 122, for example, as the application 123. The method 500 of FIG. 5 is one way in which the device 101 and/or the controller 120 is configured. Furthermore, the following discussion of the method 500 of FIG. 5 will lead to a further understanding of the device 101, and its various components.

However, it is to be understood that the device 101 and/or the controller 120 and/or the method 500 may be varied, and need not work exactly as discussed herein in conjunction with each other, and that such variations are within the scope of present embodiments.

Furthermore, the method 500 of FIG. 5 need not be performed in the exact sequence as shown and likewise various blocks may be performed in parallel rather than in sequence. Accordingly, the elements of method 500 are referred to herein as "blocks" rather than "steps".

Furthermore, while the method 500 is described with respect to execution at the device 101, the method 500 may be executed at a controller of the device 401, and/or variations of the devices 101, 401.

At a block 502, the controller 120 receives, via the communication interface 124, an electronic communication from a source contact, for example the electronic communication 103 received from the device 102. The controller 120 executing the block 502 may include providing a notification of the electronic message 103 at the device 101 in an eye-free manner, for example by controlling the speaker 130 to emit sound corresponding to a notification of the electronic message 103.

At a block 504, the controller 120 detects that a button 132, of the one or more buttons 132, has been activated.

At a block 506, the controller 120 identifies a respective function mapped to the button 132 which has been activated.

At a block 508, the controller 120 determines whether the button 132 has been activated within a threshold time period after receiving the electronic communication. For example, the threshold time period may be stored in the application 123 and/or the threshold time period may be configurable at the device 101 (e.g. using a menu system).

In some example embodiments, the threshold time period may be about 10 seconds; however, the threshold time period may be less than 10 seconds or greater than 10 seconds.

In some embodiments, when a notification of the electronic communication 103 is provided at the block 502, the threshold time period may begin after the notification is provided. For example, the notification may comprise an audible notification in which portions of the electronic message 103 are converted to sound in using text-to-speech functionality and played by the speaker 130; the threshold time period may begin after the notification is provided and/or when the notification ends.

However, in some embodiments, the electronic communication 103 may comprise a playable message, for example, a voicemail, a multimedia message, and the like, and the threshold time period may be selected to end after a given amount of time after playing the playable message. For example, when the threshold time period is 10 seconds, but the playable message is longer than 10 seconds, the threshold time period may end and/or may be extended to end within a given amount of time after the playable message ends playing, for example another 10 seconds, and the like, and/or the threshold time period may begin when the playable message ends playing. Similarly, when the electronic communication 103 is a telephone call, the threshold time period may be extended to end within a given amount of time after the end of the telephone call and/or the threshold time period may begin when the telephone call ends.

When the button 132 has been activated within the threshold time period (e.g. a "YES" decision at the block 508), at a block 510, the controller 120 performs the respective function using the source contact from which the electronic communication was received.

For example, a messaging function, an e-mail function, a push-to-talk function, a private call function, an incident management function, a video streaming function, and/or a positioning function may be performed using the source contact. For example, one or more of a message, an email, a push-to-talk call, a private call (e.g. a telephone call) and video streaming may be initiated to the source contact. Alternatively, a positioning function may be initiated to provide a location of the source contact, for example on a map rendered at the display device 126 and/or provide a route and/or directions to the source contact.

Alternatively, an incident management function may be initiated to, for example, transmit incident data collected by the device 101 (e.g. in an incident report) to the source contact and/or share incident data collected by the device 101 with the source contact and/or add the source contact to an incident report. However, other types of incident management functions are within the scope of present embodiments. For example, an incident management function may be initiated to retrieve information specific to the source contact including, but not limited to, one or more of: a location of the source contact; a role and/or rank and/or title of the source contact; equipment accessible to the source contact, for example equipment for managing an incident; incident information of an incident that a source contact is currently involved in, and the like. Such incident information retrieved by the incident management function may include, but is not limited to, one or more of: an incident name; incident severity; an incident location; an incident description; other personnel (e.g. police officers, and/or public safety officers) assigned to the incident; and the like.

Hence, in some embodiments, when implementing an incident management function, the device 101 communicates with an incident management server to retrieve such incident information.

The controller 120 may then repeat the blocks 504, 506, 508, 510 for example when another button 132 and/or the same button 132 is activated within the threshold time period. For example, the controller 120 may be further configured to perform the respective functions of any the one or more buttons 132 using the source contact, when activated within the threshold time period following receipt of the electronic communication 103. In this manner, button context of the buttons 132 is "locked in", when the electronic communication 103 is received, the button context defined by and/or based on a source contact of the electronic communication 103. Hence, each time a button 132 is activated within the threshold time period, a respective function is performed using the source contact of the electronic communication 103. Hence, the responder 115 may activate functionality of the device 101, for example to respond to the electronic communication 103, in an eyes-free/heads-up manner, such that the responder 115 does not have to look at the device 101 and/or the display device 126 to respond to the electronic communication 103.

In yet further embodiments, the threshold time period is reset each time a button 132 is activated and/or each time a respective function that is performed upon activation of a button 132 is completed. For example, when a button 132 is activated at the block 504, threshold time period may be reset, and/or when the respective function is completed at the block 510, the threshold time may be reset. Hence, when the blocks 504, 506, 508, 510 are repeated, the threshold time may be reset for each repetition. For example, when an electronic communication is received at the block 502, such as an email, the button 132-3 may be activated at the block 504 and the respective function of a phone call be performed at the block 508 to initiate a call to the source contact of the email, presuming the button 132-3 is activated within the threshold time period after receiving the email. Then, when the phone call is ended, the threshold time may be reset such that when a button 132 (which may include the previously activated button 132-3) is activated within the reset time threshold time period, a respective function is performed using the source contact. Hence, button context of the buttons 132 may be "locked in" and/or extended after each instance of activating a button 132 and/or completing performing a respective function of an activated button 132 within the threshold time period, after receiving the initial electronic communication.

Returning to the block 508, when the button 132 has been activated after the threshold time period (e.g. a "NO" decision at the block 508), at a block 512, the controller 120 performs the respective function independent of the source contact.

For example, in some embodiments, the respective function may be initiated without any contact information; hence, for example, a messaging function, an e-mail function, a push-to-talk function, a telephone function, a private call function, an incident management function, a video streaming function, and/or a positioning function may be initiated without any contact information. However, contact information may be received via receipt of input at an input device (e.g. a keyboard rendered at a touchscreen) after activation of a button 132.

Figure 6:
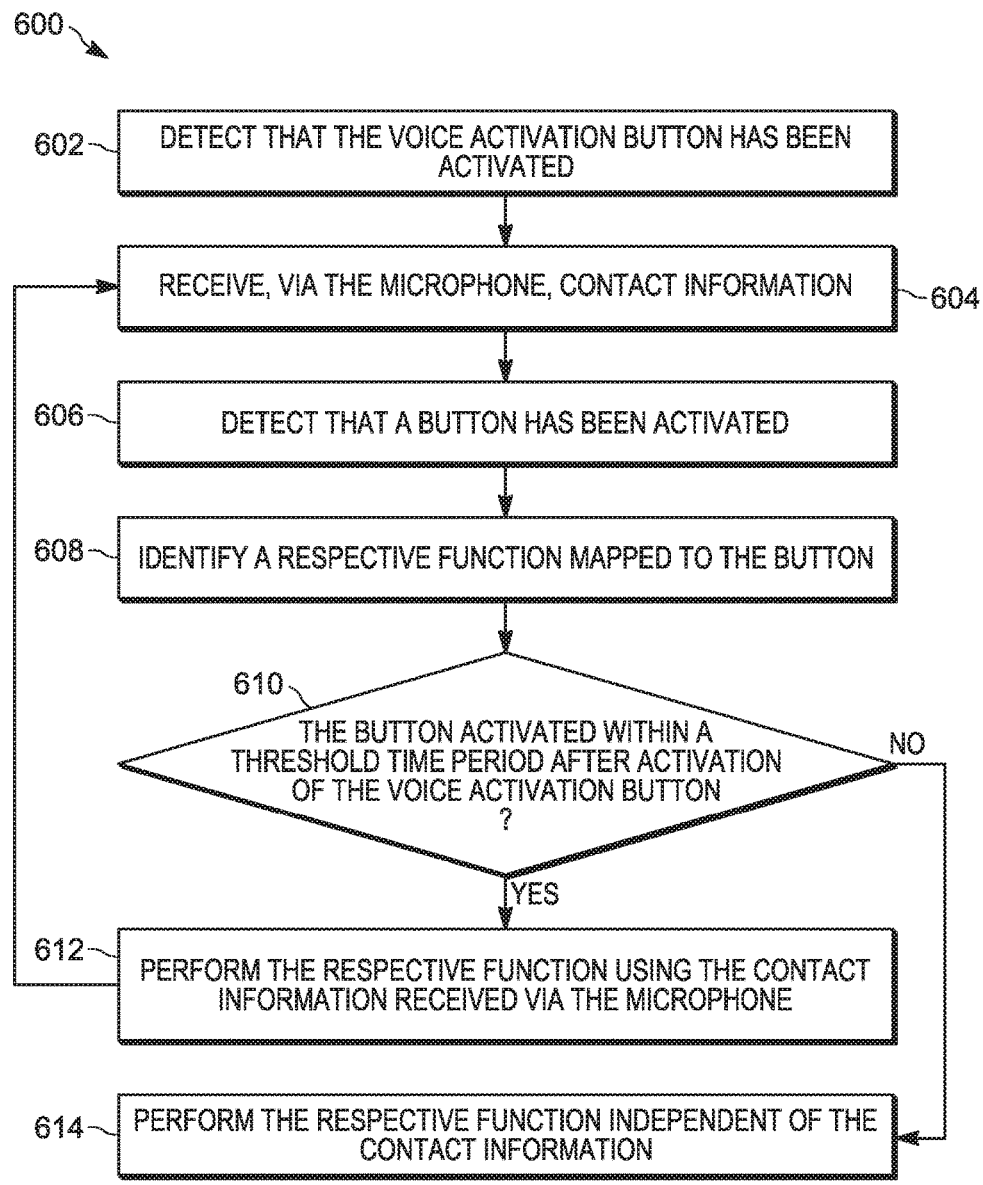
FIG. 6 is a flowchart of a method for locking in button context based on contact information received from a microphone in accordance with some embodiments.

Attention is now directed to FIG. 6 which depicts a flowchart representative of a method 600 for locking in button context based on contact information received from a microphone. In some embodiments, the operations of the method 600 of FIG. 6 correspond to machine readable instructions that are executed by, for example, the device 101, and specifically by the controller 120 of the device 101. In the illustrated example, the instructions represented by the blocks of FIG. 6 are stored at the memory 122, for example, as the application 123. The method 600 of FIG. 6 is one way in which the device 101 and/or the controller 120 is configured. Furthermore, the following discussion of the method 600 of FIG. 6 will lead to a further understanding of the device 101, and its various components.

However, it is to be understood that the device 101 and/or the controller 120 and/or the method 600 may be varied, and need not work exactly as discussed herein in conjunction with each other, and that such variations are within the scope of present embodiments.

Furthermore, the method 600 of FIG. 6 need not be performed in the exact sequence as shown and likewise various blocks may be performed in parallel rather than in sequence. Accordingly, the elements of method 600 are referred to herein as "blocks" rather than "steps".

Furthermore, while the method 600 is described with respect to execution at the device 101, the method 600 may be executed at a controller of the device 401, and/or variations of the devices 101, 401.

At a block 602, the controller 120 detects that the voice activation button 133 has been activated.

At a block 604, the controller 120 receives, via the microphone 129, contact information. The contact information may be recognized via speech-to-text functionality (e.g. at the application 123 and/or a dedicated speech-to-text application). In some embodiments, a set of contact name data 151 may be selected from the contact data 150 using the contact information received via the microphone 129; for example, the responder 115 may speak the name of a contact stored in the contact name data 151, and the controller 120 may select the corresponding contact name data 151 from the contact data 150. Alternatively, the contact information received via the microphone 129 may include a network address, and the like, which may be used to perform a respective function of a button 132.

At a block 606, the controller 120 detects that a button 132, of the one or more buttons 132, has been activated, similar to the block 504 of the method 500.

At a block 608, the controller 120 identifies a respective function mapped to the button 132 which has been activated, similar to the block 506 of the method 500.

At a block 610, the controller 120 determines whether the button 132 has been activated within a threshold time period after activation of the voice activation button 133. For example, the threshold time period may be stored in the application 123 and/or the threshold time period may be configurable at the device 101 (e.g. using a menu system). Furthermore, the threshold time period may be the same or different from the threshold time period of the block 508 of the method 500. To distinguish the threshold time period of the method 600 from the threshold time period of the method 500, the threshold time period of the method 600 is interchangeably referred to hereafter as a further threshold time period.

Hence, in some example embodiments, the further threshold time period of the block 610 may be about 10 seconds; however, the further threshold time period of the block 610 may be less than 10 seconds or greater than 10 seconds.

However, the further threshold time period may be extended to end within a given amount of time after receipt of the contact information via the microphone 129, for example another 10 seconds, and the like. Alternatively, the further threshold time period may start from receipt of the contact information via the microphone 129 at the block 604.

When the button 132 has been activated within the further threshold time period (e.g. a "YES" decision at the block 610), at a block 612, the controller 120 performs the respective function using the contact information received via the microphone 129. The block 612 is generally similar to the block 510 of the method 500, however performed with the contact information received via the microphone 129 rather than a source contact of a message.

The controller 120 may then repeat the blocks 606, 608, 610, 612 for example when another button 132 and/or the same button 132 is activated within the further threshold time period. For example, the controller 120 may be further configured to perform the respective functions of any the one or more buttons 132 using the contact information received via the microphone 129, when received within the further threshold time period following activation of the voice activation button 133. In this manner, button context of the buttons 132 is "locked in", when the voice activation button 133 is activated, the button context defined by and/or based on contact information received via the microphone 129, such that each time a button 132 is activated within the further threshold time period, a respective function is performed using the contact information received via the microphone 129. Hence, the responder 115 may activate functionality of the device 101, for example to communicate with a contact identified using the contact information received via the microphone 129, in an eyes-free/heads-up manner, such that the responder 115 does not have to look at the device 101 and/or the display device 126 to initiate such contact. As with the method 500, the further threshold time period may be reset each time a button 132 is activated and/or each time a respective function that is performed upon activation of a button 132 is completed. However, such locking in occurs when the contact information is received via the microphone 129; when no contact information received via the microphone 129 after activation of the button 133, no locking in occurs.

Returning to the block 610, when the button 132 has been activated after the further threshold time period (e.g. a "NO" decision at the block 610), at a block 614, the controller 120 performs the respective function independent of the contact information received via the microphone 129, similar to the block 512 of the method 500.

The method 500 and the method 600 will now be described with reference to FIG. 7 to FIG. 18.

Figure 7:
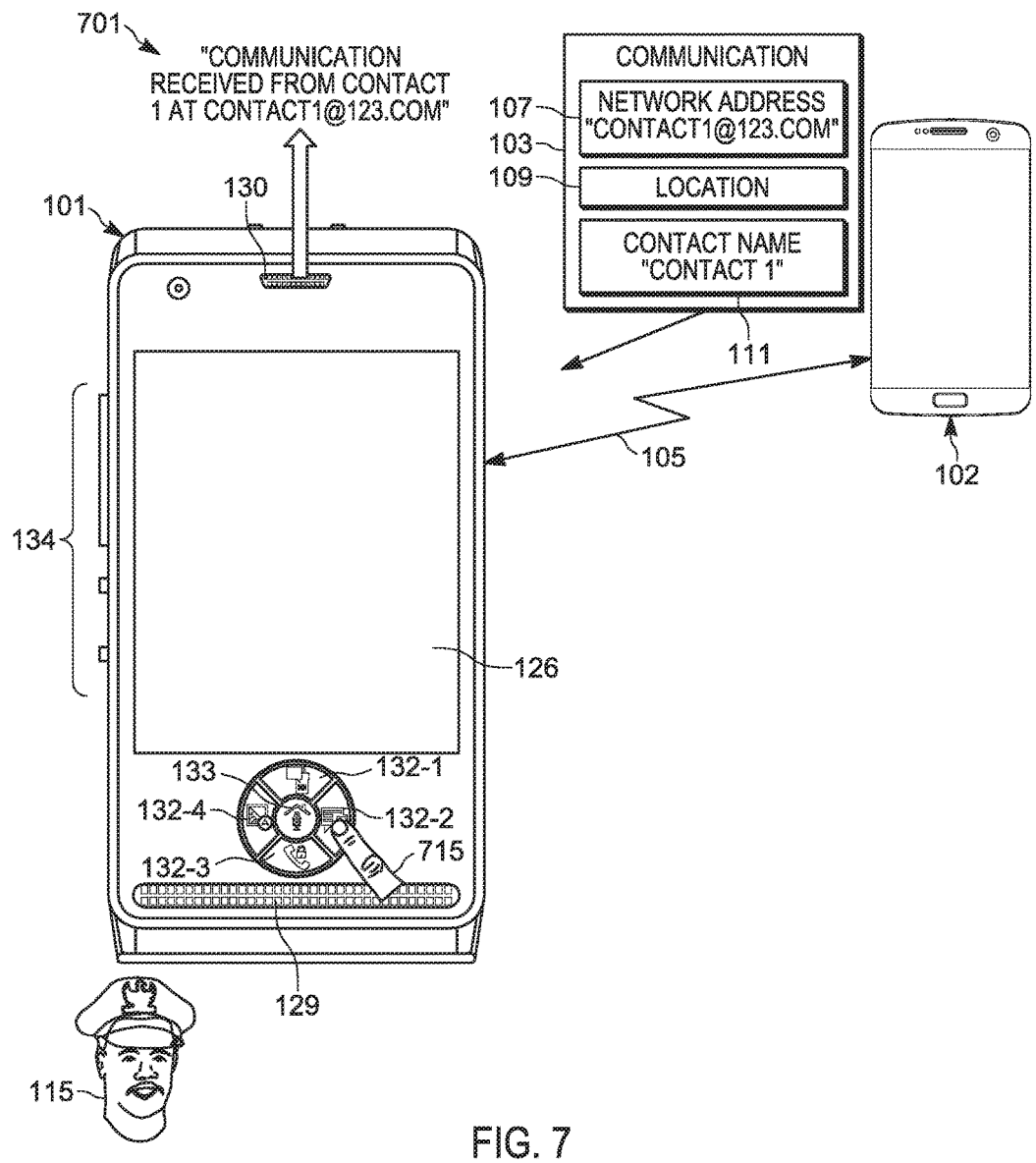
FIG. 7 depicts a button at the device of FIG. 1 being activated within a threshold time period after receiving an electronic communication in accordance with some embodiments.
Figure 8:
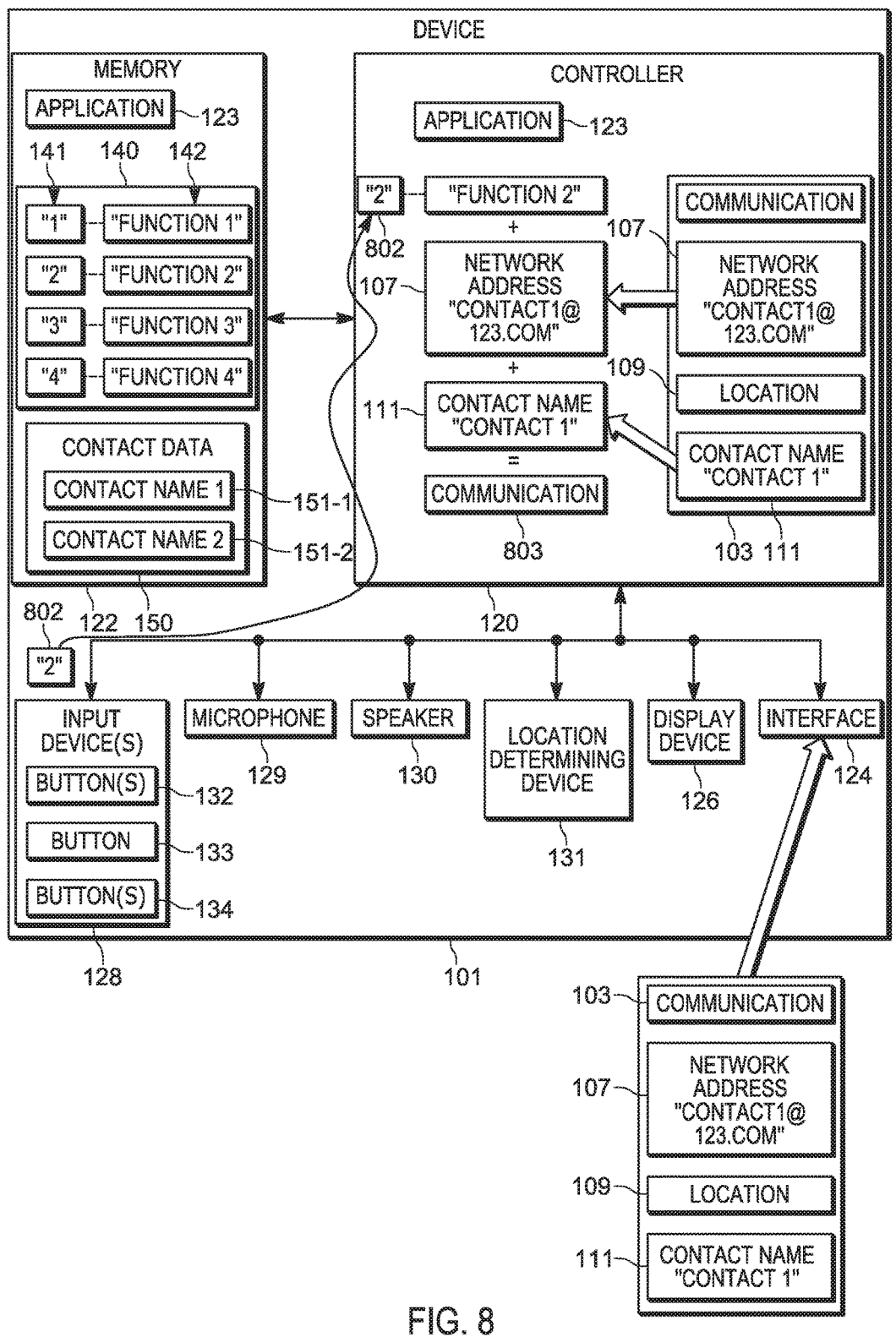
FIG. 8 depicts the device generating an electronic communication using a network address received in the electronic communication within a threshold time period after receiving the electronic communication in accordance with some embodiments.

Attention is next directed to FIG. 7, FIG. 8, FIG. 9, FIG. 10, FIG. 11 and FIG. 12 which depict an example embodiment of the method 500. Each of FIG. 7, FIG. 9, FIG. 10 and FIG. 11. is substantially similar to FIG. 1, and FIG. 8 is substantially similar to FIG. 3, with like elements having like numbers. Furthermore, it is assumed in FIG. 7, FIG. 8, FIG. 9, FIG. 10, FIG. 11 and FIG. 12 that the controller 120 is executing the application 123 and is performing at least the method 500.

Indeed, in FIG. 7 and FIG. 8, the device 101 and the controller 120 are depicted as receiving the electronic communication 103 (e.g. at the block 502 of the method 500), for example via the interface 124. It is assumed that receipt of the electronic communication 103 triggers the controller 120 to determine whether a button 132 is activated within the threshold time period of the method 500.

With reference to FIG. 7, the controller 120 may, in some example embodiments, control the speaker 130 to emit sound 701 to provide a notification of the electronic communication 103 (e.g. at the block 502 of the method 500) in an eyes-free manner, and/or announce receipt of the electronic communication 103; for example, as depicted, the sound 701 corresponds to text "Communication Received From Contact1 At contact1@123.com". The sound 701 may be generated using the network address 107 (e.g. "contact1@123.com") received in the electronic communication 103 and/or the contact name 111 (e.g. "Contact 1") received in the electronic communication 103, and/or any other data received in the electronic communication 103. For example, when the electronic communication 103 includes text, the controller 120 may control the speaker 130 to emit sound corresponding to the text. As such, the controller 120 may be configured for text-to-speech functionality (e.g. via the application 123 and/or a dedicated text-to-speech application) to convert text in the electronic communication 103 to sound, for example that mimics a human voice, and the like, the sound emitted by the speaker 130.

Indeed, the controller 120 may control the speaker 130 to emit any type of notification of the electronic communication 103, which may depend on the format of the electronic communication 103. Furthermore, when the electronic communication 103 comprises a playable message, the responder 115 may control playing of the playable message via voice interaction using the speaker 130. In this manner, the responder 115 may be alerted to receipt of the electronic communication 103 and/or play a playable message, in an eyes-free/heads-up manner. However, the controller 120 may alternatively display and/or provide and/or render the electronic communication 103 at the display device 126.

However, the threshold time period may alternatively begin after a notification (e.g. the sound 701) is provided. Furthermore, when the electronic communication 103 comprises a playable message, the threshold time period may alternatively begin after the playable message is played.

Presuming that the electronic communication 103 has been received, and that the controller 120 is tracking the threshold time period of the method 500, a finger 715 of the responder 115 is depicted as activating the button 132-2 to activate, for example, a messaging function (e.g. an email function and/or a texting function) using the source contact from which the electronic communication 103 was received. With reference to FIG. 8, the controller 120 detects (e.g. at the block 504 of the method 500) that the button 132-2 has been activated, for example by receiving an indication 802 from the button 132-2. As depicted, the indication 802 comprises data that enables the controller 120 to detect that the button 132-2 was activated, as depicted text "2" similar to the text "2" of the identifiers 141. However, the indication 802 may comprise any type of indication and/or data and/or signal.

The controller 120 identifies (e.g. at the block 506 of the method 500) the respective function mapped to the button 132-2 that has been activated, for example "Function 2", which comprises a messaging function in example embodiments of FIG. 7 and FIG. 8. For example, the respective function mapped to the button 132-2 may be identified using the mapping 140, and in FIG. 8, the controller 120 has retrieved the instructions "Function 2" corresponding to the button 132-2 using the indication 802, for example by comparing the indication 802 with the identifiers 141 to determine a match, and the like. However, the indication 802 may alternatively be used to look-up the respective function in the mapping 140 using look-up table and/or database techniques, and/or used to identify the respective function when the button 132-2 is dedicated to the respective function.

As it is assumed that the button 132-2 was activated within the threshold time period (e.g. a "YES" decision at the block 508), the controller 120 performs (e.g. at the block 510) the respective function "Function 2", and specifically the messaging function, using the source contact from which the electronic communication 103 was received. For example, as also depicted in FIG. 8, the controller 120 extracts the network address 107 and optionally the contact name 111 from the electronic communication 103, to generate an electronic communication 803 (e.g. as depicted, an email message) to the network address 107 and optionally including the contact name 111 in the electronic communication 103. The controller 120 may generate the electronic communication 803 and optionally display and/or provide and/or render the message at the display device 126

Figure 9:
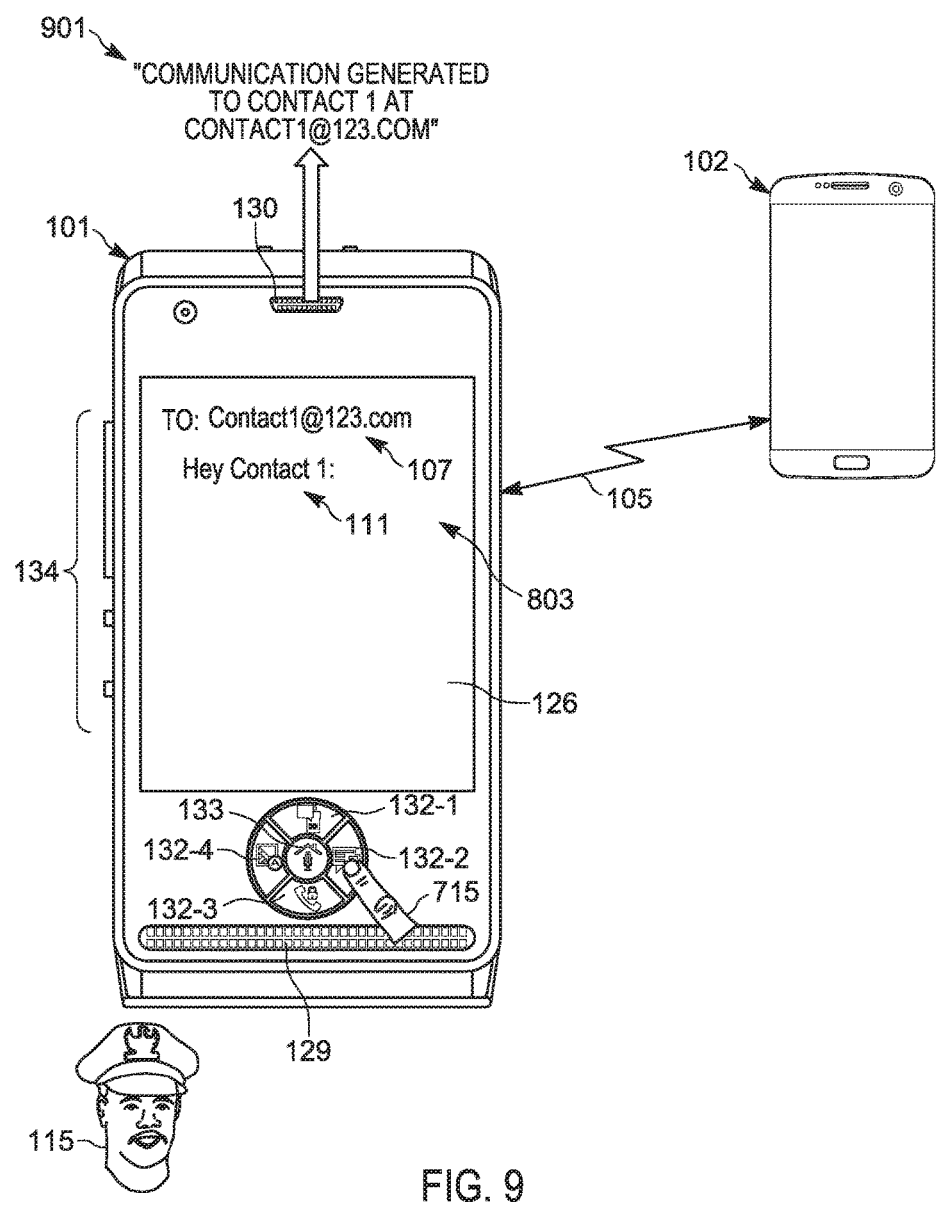
FIG. 9 depicts the electronic communication generated within a threshold time period after receiving the electronic communication in accordance with some embodiments.

For example, attention is directed to FIG. 9 which depicts the electronic communication 803 at the display device 126, the electronic communication 803 addressed to the network address 107, and the electronic communication 803 including a greeting that includes the contact name 111 (e.g. "Hey Contact 1:". In FIG. 9, the electronic communication 103 is not depicted as it is assumed the electronic communication 103 was previously received. The responder 115 may add text to the electronic communication 803, for example by interacting with a keyboard of the device 101 (including, but not limited to, a keyboard rendered at the display device 126).

However, the responder 115 may also add text to the electronic communication 803 via voice commands, voice interactions, and the like; indeed, the responder 115 may complete and send the message entirely through the use of voice commands, voice interactions, and the like, received at the microphone 129. Furthermore, the controller 120 may control the speaker 130 to "play" the text of the electronic communication 803 upon generation of the electronic communication 803, including, for example, the network address 107 and optionally the greeting that includes the contact name 111, such that the responder 115 may interact with the device 101 entirely through voice commands and/or voice interactions after activation of the button 132-2. For example, as depicted in FIG. 9, the speaker 130 is emitting sound 901 corresponding to text "Communication Generated To Contact1 At contact1@123.com".

Figure 10:
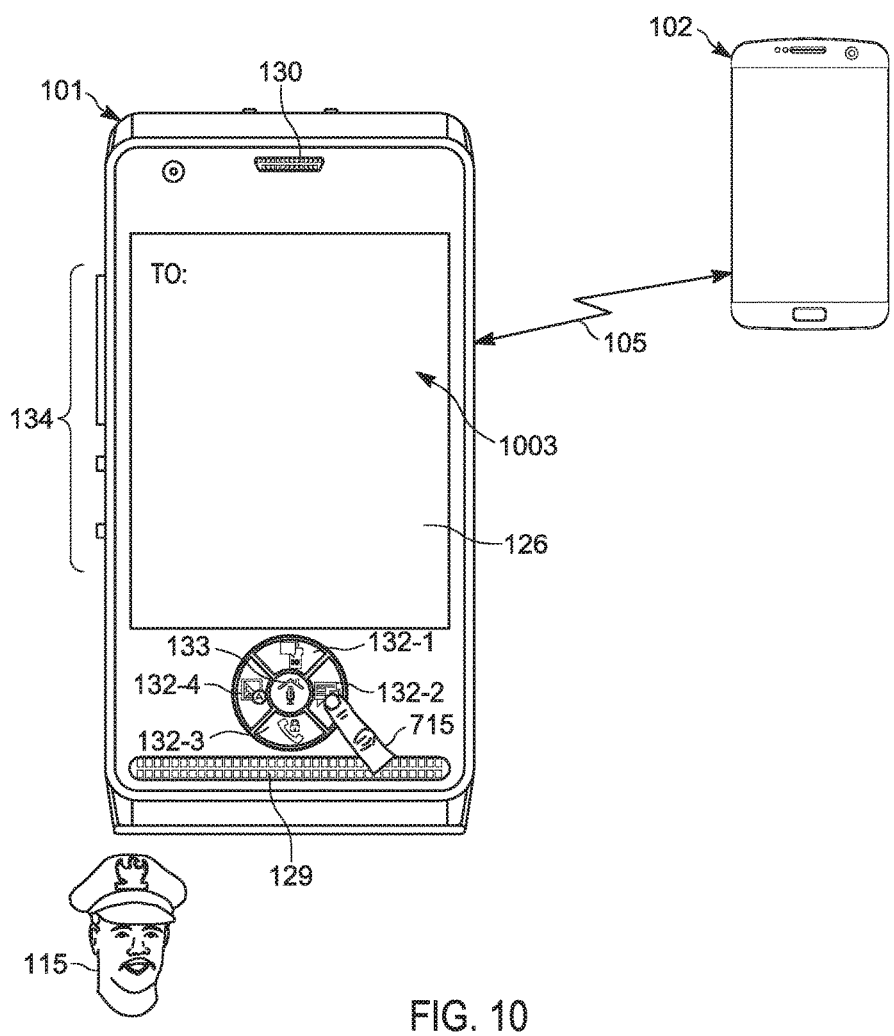
FIG. 10 depicts an example of the device performing a respective function independent of a source contact in accordance with some embodiments.

Attention is next directed to FIG. 10 which depicts an example embodiment of the block 512 of the method 500. It is assumed in FIG. 10 that the button 132-2 has been activated after the threshold time period (e.g. by the finger 715) and hence the respective function associated with the button 132-2 is performed independent of the source contact from which the electronic communication 103 is received. Hence, for example, an electronic communication 1003 (e.g. as depicted, an email message) is generated that has not yet been addressed to a network address, nor does the electronic communication 1003 include a greeting to a contact name. The responder 115 may add a network address to the electronic communication 1003, as well as any greetings and/or text, via voice commands, voice interactions, and the like, and/or by interactions with a keyboard, and the like.

Figure 11:
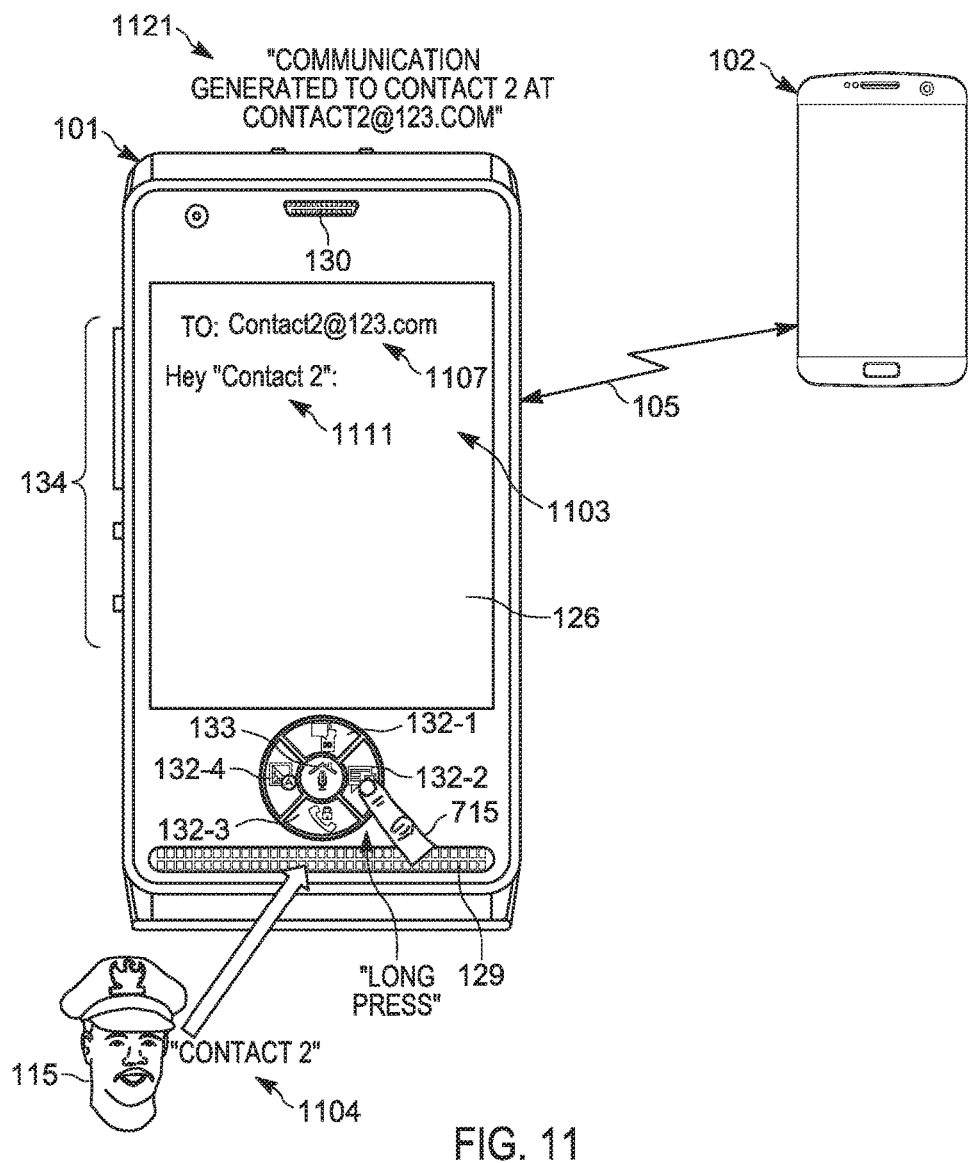
FIG. 11 depicts an electronic communication generated after a threshold time period after receiving the electronic communication, using contact information received at a microphone, after a long press at a button, in accordance with some embodiments.

In yet further embodiments, with reference to FIG. 11, the button 132-2 may be activated after the threshold time period according to a given pattern, for example a long press and the like (described in more detail below with respect to FIG. 18), and the controller 120 may perform the respective function associated with the button 132-2 using contact information received via the microphone 129.

For example, as depicted, after the threshold time period, the finger 715 of the responder 115 activates the button 132-2 according to a "Long Press", and the responder 115 may speak a name of contact (e.g. "Contact 2") which is received as sound 1104 at the microphone 129.

The contact name in the sound 1104 may be used by the controller 120 to extract a corresponding network address and/or any further contact data, from a set of contact name data 151 (e.g. the contact name data 151-2) that includes the name of the contact received in the sound 1104. Hence, as depicted in FIG. 11, an electronic communication 1103 (e.g. as depicted an email message) has been addressed to a network address 1107 and includes a greeting to a contact name 1111, which may be the same or different as the contact name received in the sound 1104; it is assumed that the network address 1107 and the contact name 1111 are extracted from a set of contact name data 151 (e.g. the contact name data 151-2). Details of such extraction will be described below with reference to the method 600 in FIG. 14, FIG. 15 and FIG. 16.

Also depicted in FIG. 11, the controller 120 may control the speaker 130 to "play" the text of the electronic communication 1103 upon generation of the electronic communication 1103, including, for example, the network address 1107 and optionally the greeting that includes the contact name 1111, such that the responder 115 may interact with the device 101 entirely through voice commands and/or voice interactions after activation of the button 132-2. For example, as depicted in FIG. 11, the speaker 130 is emitting sound 1121 corresponding to text "Communication Generated To Contact2 At contact2@123.com", assuming that the network address (e.g. an email address) of "Contact 2" is contact2@123.com.

While the method 500 was described with reference to a messaging function (e.g. an email function), the function performed at the block 510 depends on the button 132 which is activated and the associated respective function. Furthermore, any information that may be used to perform a specific respective function may be extracted from a corresponding set of contact name data 151. For example, a telephone number may not be received in the electronic communication 103; hence, when the button 132-3 is activated during the threshold time period, to perform a private call function (e.g. a telephone function), the telephone number may be extracted from the contact name data 151-1. The contact name data 151-1 may be determined to be associated with the contact name 111 received in the electronic communication 103, as described above. The private call function may then be executed to initiate a telephone call to device 102 using the telephone number from the contact name data 151-1.

Similarly, assuming that a talkgroup identifier was not received in the electronic communication 103, and further assuming that the button 132-1 is activated during the threshold time period, to perform a push-to-talk function, the talkgroup identifier may be extracted from the contact name data 151-1. The contact name data 151-1 may be determined to be associated with the contact name 111 received in the electronic communication 103, as described above. The push-to-talk function may then be executed to initiate a push-to-talk call to device 102 using the talkgroup identifier from the contact name data 151-1. The talkgroup identifier may identify a talkgroup that includes the source contact, as well as other contacts, such that when a push-to-talk function is initiated during the method 500 and/or the method 600, a push-to-talk call to the group is initiated. However, in other embodiments, when a push-to-talk function is initiated during the method 500 and/or the method 600, a push-to-talk call to the only the source contact is initiated.

Figure 12:
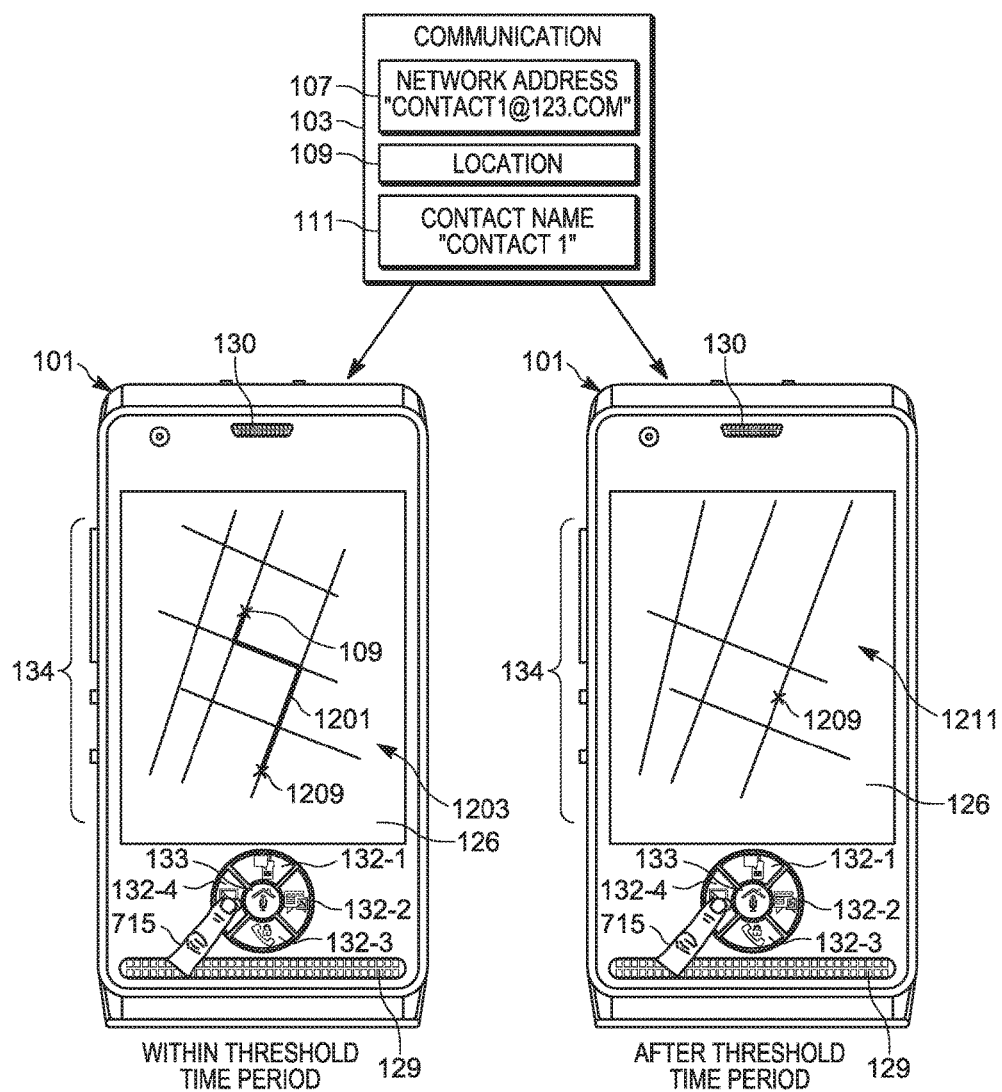
FIG. 12 depicts a positioning function performed within a threshold time period after receiving the electronic communication and after the threshold time period in accordance with some embodiments.

Attention is next directed to FIG. 12 which depicts the device 101 receiving the electronic communication 103 (though the device 102 is not depicted for clarity) and example embodiments of a positioning function executed at the controller 120 when the button 132-4 is activated during the threshold time period and after the threshold time period. FIG. 12 is otherwise similar to FIG. 1, with like elements having like numbers.

Presuming that the button 132-4 is activated during the threshold time period, when performing a positioning function, the controller 120 provides one or more of: a location 109 of the source contact and/or the device 102; and a route 1201 (e.g. which may include directions) to the source contact and/or the device 102, as depicted on the left side of FIG. 12. For example, as depicted, the controller 120 may provide, at the display device 126, one or more of: the location 109 of the source contact and/or the device 102; and a route 1201 to the source contact and/or the device 102 (e.g. a route to the location 109). In these embodiments, activation of the positioning function, using the button 132-4, may cause the controller 120 to generate a map 1203 at the display device 126 that includes the location 109 received in the electronic communication 103 and/or a route to the location 109, for example from a current location 1209 of the device 101 determined using the location determining device 131. Alternatively, for example when the location 109 is not received in the electronic communication 103, a location of the device 102 may be requested from the device 102 and/or requested from a server (e.g. a location service server), and the like, (not depicted) which tracks locations of devices, including the device 102; such a server may be operated by a public safety agency managing the device 102 (and/or the device 101); in some of these embodiments, it is assumed that a location service function has been turned "on" at the device 102 and that the device 102 is providing the location 109 to a location service server.

Alternatively, the controller 120 may provide, using the speaker 130, one or more of: the location 109 of the source contact; and the route 1201 to the source contact, for example by controlling the speaker 130 to emit sound corresponding to the location 109 and/or directions for following the route 1201 to the location 109.

However, presuming that the button 132-4 is activated after the threshold time period, to perform a positioning function, the controller 120 may provide a current location 1209 of the device 101, as depicted on the right side of FIG. 12 (e.g. independent of the location 109 of the source contact and/or the device 102). For example, as depicted, the controller 120 may provide, at the display device 126, the current location 1209 of the device 101, determined using the location determining device 131. In these embodiments, activation of the positioning function using the button 132-4 may cause the controller 120 to generate a map 1211 at the display device 126 that includes the current location 1209, but not the location 109.

Alternatively, the controller 120 may provide, using the speaker 130, the current location 1209, and further receive voice commands and/or voice instructions via the microphone 129 to generate a route to a location received via the microphone 129.

Attention is next directed to FIG. 13, FIG. 14, FIG. 15, FIG. 16 and FIG. 17 which depict an example embodiment of the method 600. Each of FIG. 13, FIG. 15 and FIG. 17.

is substantially similar to FIG. 1 (though the device 101 is depicted without the device 102, the electronic communication 103, and the link 105), with like elements having like numbers. Each of FIG. 14, and FIG. 16 is substantially similar to FIG. 3, with like elements having like numbers. Furthermore, it is assumed in FIG. 13, FIG. 14, FIG. 15, FIG. 16 and FIG. 17 that the controller 120 is executing the application 123 and is performing at least the method 600.

Figure 13:
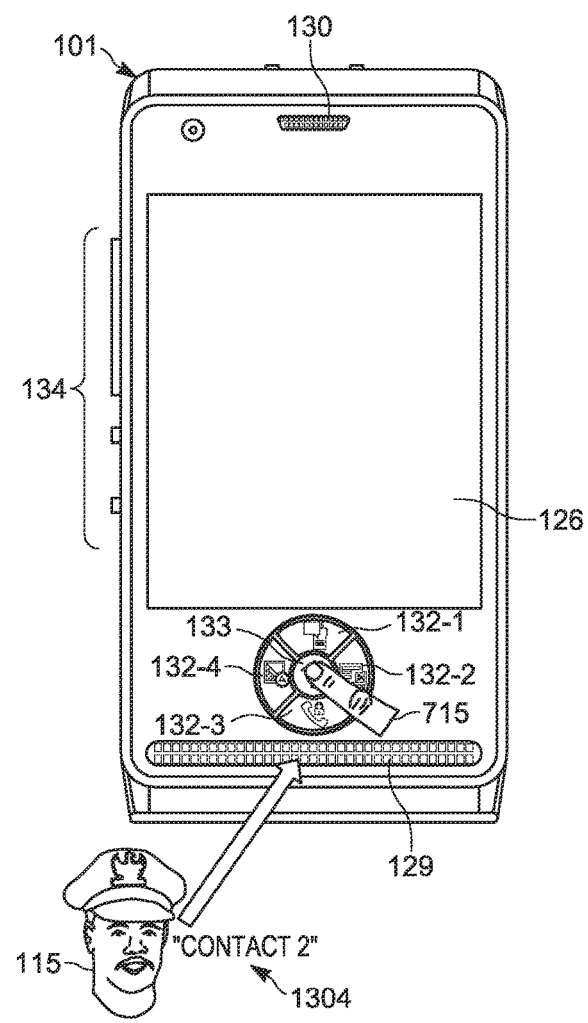
FIG. 13 depicts a voice activation button at the device of FIG. 1 being activated and contact information being received via a microphone in accordance with some embodiments.
Figure 14:
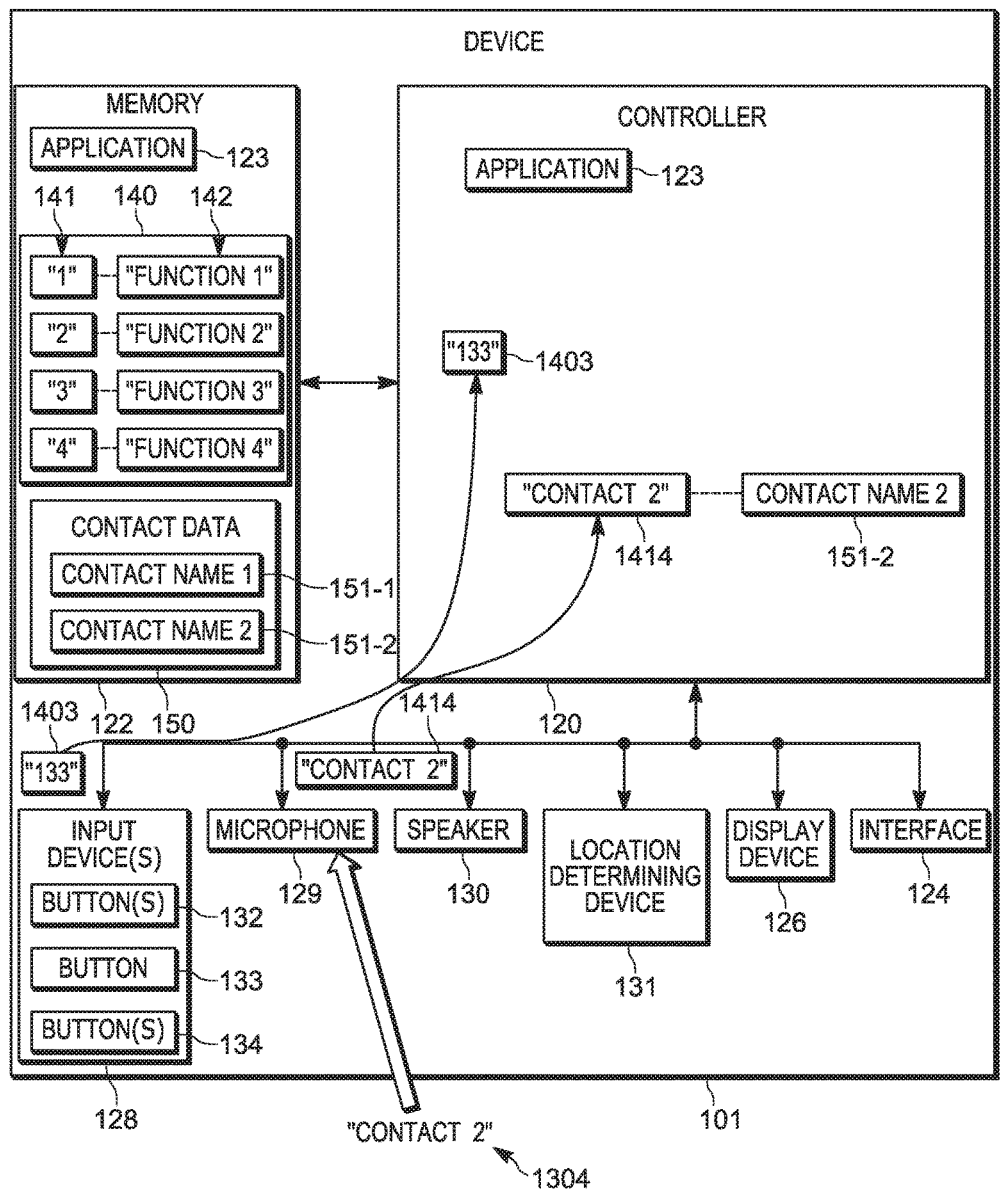
FIG. 14 depicts the device retrieving contact name data from a memory, using the contact information received via the microphone in accordance with some embodiments.

Indeed, in FIG. 13 and FIG. 14, the device 101 and the controller 120 are depicted as detecting that the voice activation button 133 has been activated (e.g. at the block 602 of the method 600) and are further depicted as receiving, via the microphone 129, contact information, for example when the button 133 is activated. It is assumed that activation of the button 133 and/or the receipt of the contact information via the microphone 129 triggers the controller 120 to determine whether a button 132 is activated within the further threshold time period of the method 600.

For example, with reference to FIG. 13, the finger 715 of the responder 115 is depicted as activating the button 133 and speaking a name of a contact (e.g. "Contact 2") which is received as sound 1304 at the microphone 129. With reference to FIG. 14, the controller 120 detects (e.g. at the block 602 of the method 600) that the button 133 has been activated, for example by receiving an indication 1403 from the button 133. As depicted, the indication 1403 comprises data that enables the controller 120 to detect that the button 133 was activated, as depicted text "133". However, the indication 1403 may comprise any type of indication and/or data and/or signal.

The controller 120 further receives (e.g. at the block 604 of the method 600) contact information 1414 via the microphone 129, for example, the contact information 1414 may comprise the sound 1304 received at the microphone 129 converted to text, and the like. The controller 120 may then retrieve associated contact name data 151-1 from the contact data 150 using, for example a name, and the like in the contact information 1414, for example to retrieve a network address, telephone number, a talkgroup identifier, and the like associated with the contact name data 151-2.

In other words, it is assumed in the depicted example embodiment that the sound 1304 includes a contact name that may be used to retrieve the contact name data 151-2. Alternatively, the responder 115 may speak contact information that includes a network address, a telephone number, a talkgroup identifier, and the like, which may be converted to text (e.g. as contact information 1414) and used in a respective function associated with the buttons 132.

Figure 15:
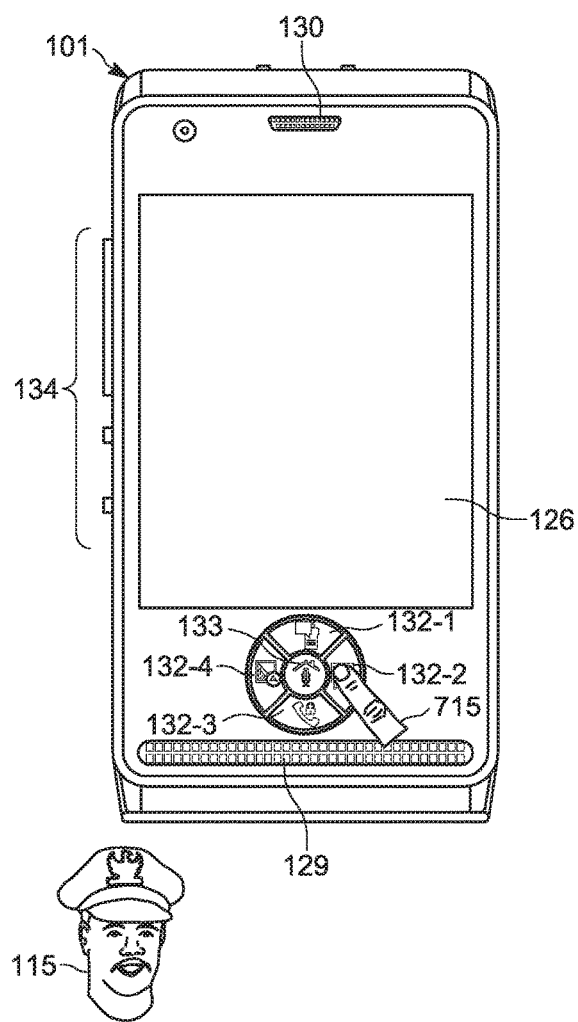
FIG. 15 depicts a button at the device of FIG. 1 being activated within a threshold time period after the voice activation button is activated in accordance with some embodiments.
Figure 16:
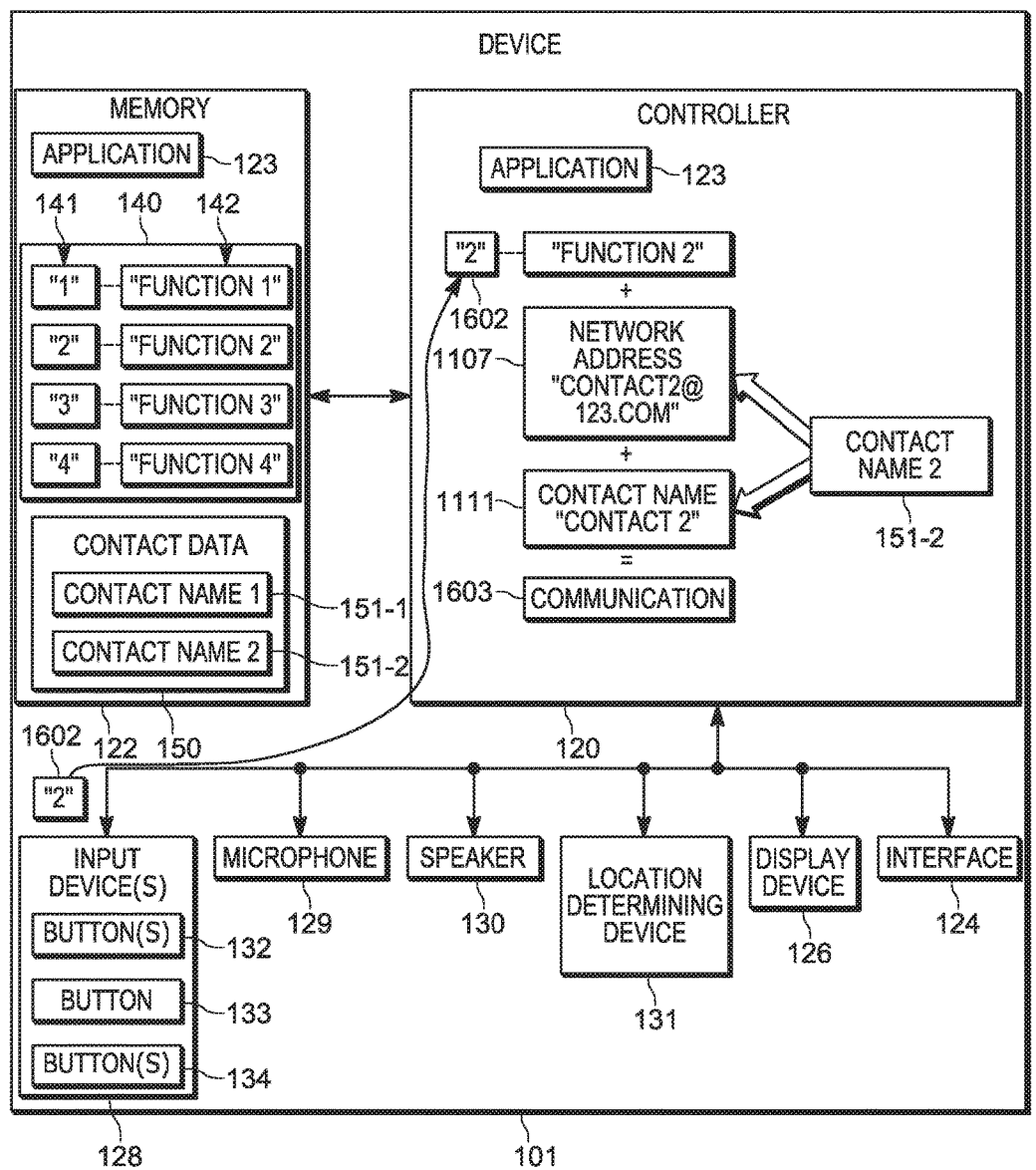
FIG. 16 depicts the device generating an electronic communication using a network address based on contact information received via the microphone in accordance with some embodiments.

With reference to FIG. 15, after activating the button 133, and providing the contact information as the sound 1304, the responder 115 may activate a button 132-2 as described above with respect to FIG. 7.

With reference to FIG. 16, the controller 120 detects (e.g. at the block 606 of the method 600) that the button 132-2 has been activated, for example by receiving an indication 1602 from the button 132-2 which is similar to the indication 802, as described above with respect to FIG. 8.

With further reference to FIG. 16, the controller 120 identifies (e.g. at the block 608 of the method 600) the respective function mapped to the button 132-2 that has been activated, for example "Function 2", which comprises a messaging function in example embodiments of FIG. 15 and FIG. 16. Hence, similar to FIG. 8, the respective function mapped to the button 132-2 may be identified using the mapping 140 and in FIG. 16, the controller 120 has retrieved the instructions "Function 2" corresponding to the button 132-2 using the indication 1602, for example by comparing the indication 1602 with the identifiers 141 to determine a match, and the like. However, the indication 1602 may alternatively be used to look-up the respective function in the mapping 140 using look-up table and/or database techniques, and/or used to identify the respective function when the button 132-2 is dedicated to the respective function.

As it is assumed that the button 132-2 was activated within the further threshold time period of the method 600 (e.g. a "YES" decision at the block 610), the controller 120 performs (e.g. at the block 612) the respective function "Function 2", and specifically the messaging function, using the contact information received via the microphone 129. For example, as depicted in FIG. 16, the controller 120 may retrieve the network address 1107 and optionally the contact name 1111 from the contact name data 151-2, to generate an electronic communication 1603 (e.g. an email message) to the network address 1107 and optionally including the contact name 1111. Alternatively, a contact name received in the contact information 1414 may be used in the electronic communication 1603. The controller 120 may generate the electronic communication 1603 and display and/or provide and/or render the electronic communication 1603 at the display device 126 and/or play the electronic communication 1603 at the speaker 130.

Figure 17:
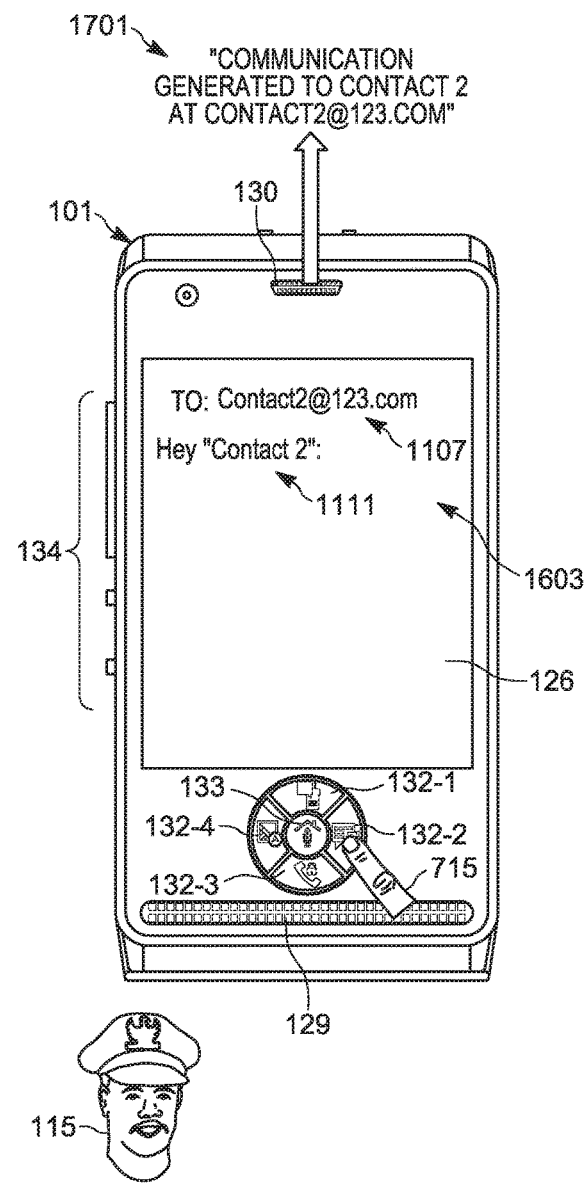
FIG. 17 depicts an electronic communication generated after activation of the voice activation button, using contact information received at a microphone, in accordance with some embodiments.

For example, attention is directed to FIG. 17 which depicts the electronic communication 1603 at the display device 126, the electronic communication 1603 addressed to the network address 1107, and the electronic communication 1603 including a greeting to the contact name 1111. The responder 115 may add text to the electronic communication 1603, for example by interacting with a keyboard of the device 101 (including, but not limited to, a keyboard rendered at the display device 126).

However, similar to embodiments described above with respect to the method 500, the responder 115 may also add text to the electronic communication 1603 via voice commands, voice interactions, and the like; indeed, the responder 115 may complete and send the message entirely through the use of voice commands, voice interactions, and the like, received at the microphone 129. Furthermore, the controller 120 may control the speaker 130 to "play" the text of the electronic communication 1603 upon generation of the electronic communication 1603, including, for example, the network address 1107 and optionally the greeting that includes the contact name 1111, such that the responder 115 may interact with the device 101 entirely through voice commands and/or voice interactions after activation of the button 132-2. For example, as depicted in FIG. 17, the speaker 130 is emitting sound 1701 corresponding to text "Communication Generated To Contact1 At contact1@123.com".

Furthermore, the block 614 may be implemented at the controller 120 in manner similar to the block 512 of the method 500, as described above with reference to FIG. 10.

While the method 600 was described with reference to a messaging function (e.g. an email function), the function performed at the block 612 depends on the button 132 which is activated and the associated respective function, similar to that described above with respect to the method 500. However, when a positioning function is performed, for example when the button 132-4 is activated, a location of a device and/or a contact identified via the contact information received via the microphone 129 may be requested from an associated device (e.g. at a network address stored in the contact name data 151-1) and/or a server, and the like, (not depicted) which tracks locations of devices.

In some embodiments, whether the method 500 and/or the method 600 is being implemented, a button 132 may be activated with a threshold time period according to a given pattern, for example a short press, a long press, a double press and the like. Furthermore, when a respective function is performed (e.g. at the block 510 of the method 500 and/or the block 612 of the method 600) may be dependent on the given pattern.

Such embodiments assume that the controller 120 is configured to distinguish between different given patterns of activation of the buttons 132, for example to distinguish between a short press (e.g. a button 132 is activated for less than a given time period), a long press (e.g. a button 132 is activated for longer than a given time period), and a double press (e.g. a button 132 is activated twice within a given time period).

For example, when implementing the method 500, at the block 504, the controller 120 may detect that a button 132 has been activated according to a first given pattern or a second given pattern. Furthermore, when implementing the block 510, the controller 120 may, when a button 132 is activated according to the first given pattern, within the threshold time period of the method 500, perform the respective function according to a first mode. Similarly, when implementing the block 510, the controller 120 may, when a button 132 is activated according to the second given pattern, within the threshold time period of the method 500, perform the respective function according to a second mode. In yet further embodiments, when implementing the block 510, the controller 120 may, when a button 132 is activated according to a third given pattern, within the threshold time period of the method 500, perform the respective function according to a third mode. At least one of the modes is performed using the source contact from which the electronic communication 103 was received, however other modes may be performed independent of the source contact from which the electronic communication 103 was received.

Similarly, when implementing the method 600, at the block 606, the controller 120 may detect that a button 132 has been activated according to a first given pattern or a second given pattern. Furthermore, when implementing the block 612, the controller 120 may, when a button 132 is activated according to the first given pattern, within the threshold time period of the method 600, perform the respective function according to a first mode. Similarly, when implementing the block 612, the controller 120 may, when a button 132 is activated according to the second given pattern, within the threshold time period of the method 600, perform the respective function according to a second mode. In yet further embodiments, when implementing the block 612, the controller 120 may, when a button 132 is activated according to a third given pattern, within the threshold time period of the method 600, perform the respective function according to a third mode. At least one of the modes is performed using the using the contact information received via the microphone 129, however other modes may be performed independent of the using the contact information received via the microphone 129.

For example, attention is next directed to FIG. 18 which depicts a table 1800 which defines different example modes of the respective functions of the buttons 132, for different given patterns of activation of the buttons 132 during a threshold time period (e.g. of either the method 500 or the method 600), including a short press, a long press and a double press. The table 1800, and the like, may be stored at the memory 122, for example, as a component of the application 123.

Hence, for example, when the push-to-talk function is performed when the button 132-1 is activated during a threshold time period: for a short press, a last missed push-to-talk call is announced, for example at the speaker 130 (e.g. independent of the source contact of the electronic communication 103 and/or contact information received via the microphone 129, and assuming that the controller 120 maintains a record of missed push-to-talk calls); no respective function is performed for a double press; and for a long press, a push-to-talk call is initiated for a current contact (e.g. the source contact of the electronic communication 103 and/or a contact defined by the contact information received via the microphone 129).

Similarly, when the messaging function is performed when the button 132-2 is activated during a threshold time period: for a short press, an unread message (e.g. an unread electronic communication, assuming the electronic communication is a message and/or an email) is played, for example at the speaker 130 (e.g. independent of the source contact of the electronic communication 103 and/or contact information received via the microphone 129, and assuming that the controller 120 maintains a record of unread messages) and the controller 120 toggles and/or moves to a next unread message (which may be played upon receipt of another short press of the button 132-2); for a double press, the message may be replayed at the speaker 130; and for a long press, a message is initiated to a current contact (e.g. the source contact of the electronic communication 103 and/or a contact defined by the contact information received via the microphone 129).

Similarly, when the private call function is performed when the button 132-3 is activated during a threshold time period: for a short press, a last missed private call (e.g. a received electronic message comprises a telephone call) is announced, for example at the speaker 130 (e.g. independent of the source contact of the electronic communication 103 and/or contact information received via the microphone 129, and assuming that the controller 120 maintains a record of missed private calls and/or telephone calls); no respective function is performed for a double press; and for a long press, a private call is initiated for a current contact (e.g. the source contact of the electronic communication 103 and/or a contact defined by the contact information received via the microphone 129) which may include a call back when the electronic communication 103 received is telephone call.

Similarly, when the positioning function is performed when the button 132-4 is activated during a threshold time period: for a short press, a location of a current contact (e.g. the source contact of the electronic communication 103 and/or a contact defined by the contact information received via the microphone 129) is provided on a map at the display device 126 (e.g. as in FIG. 12) and/or announced at the speaker 130; no respective function is performed for a double press; and for a long press, directions to a location of the current contact is provided on a map at the display device 126 (e.g. as also depicted in FIG. 12) and/or announced at the speaker 130.

After a threshold time period, when any of the buttons 132 are activated, for example using a long press (e.g. as described above with respect to FIG. 11), and hence there is initially no "selected" contact, the controller 120 receives contact information via the microphone 129 as described above with respect to FIG. 11, and initiates a respective function. In particular when the button 132-4 is activated to perform a positioning function, a location may be received via the microphone 129, and the controller 120 may one or more of: map the location and/or provide directions to the location.

As depicted, the activation of the button 133 may also occur according to a given pattern, for example a short press or a long press. For a short press, any of the methods 500, 600 may be aborted, cancelled and/or restarted (and/or a "Home" screen may be provided at the display device 126). For a long press, the method 600 is initiated and contact information is received at the microphone 129 as described above with respect to FIG. 13, FIG. 14, FIG. 15, FIG. 16, and FIG. 17.

Furthermore, in some embodiments, when the button 133 is activated according to a long press (and the like) while the method 500 is being performed, the method 500 may be aborted, and the method 600 initiated.

Similarly, in some embodiments, when a message is received while the method 600 is being performed, the method 600 may be aborted, and the method 500 initiated.

Provided herein is a device and method for locking in button context based on a source contact of an electronic communication. For example, a respective function for button may be "locked in" to a context defined by a source contact of an electronic communication, at least for a threshold time period. During the threshold time period following receipt of the electronic communication, the respective functions of any of one or more buttons at the device are performed using the source contact. Also provided herein is a device and method for locking in button context based on a contact information received via a microphone. For example, a respective function for button may be "locked in" to a context, after activation of a voice activation button, the context defined by contact information received via a microphone after activation of a voice activation button, at least for a threshold time period. During the threshold time period following activation of a voice activation button, the respective functions of any of one or more buttons at the device are performed using the contact information received via a microphone.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

In this document, language of "at least one of X, Y, and Z" and "one or more of X, Y and Z" may be construed as X only, Y only, Z only, or any combination of two or more items X, Y, and Z (e.g., XYZ, XY, YZ, XZ, and the like). Similar logic may be applied for two or more items in any occurrence of "at least one . . . " and "one or more . . . " language.

Moreover, in this document, relational terms such as first and second, top and bottom, and the like may be used solely to distinguish one entity or action from another entity or action without necessarily requiring or implying any actual such relationship or order between such entities or actions.

The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

We claim:

1. A device comprising:
   a communication interface;
   one or more buttons, each mapped to activation of respective functions;
   a display device; and
   a controller configured to:
      receive, via the communication interface, an electronic communication from a source contact;
      detect that a button, of the one or more buttons, has been activated;
      identify a respective function mapped to the button, the respective function comprising a positioning function;
      when the button is activated within a threshold time period after receiving the electronic communication, perform the respective function using the source contact from which the electronic communication was received by providing, at the display device, one or more of: a location of the source contact and a route to the source contact; and
      when the button is activated after the threshold time period, perform the respective function independent of the source contact by providing, at the display device, a current location of the device.

2. The device of claim 1, wherein the respective functions comprise one or more of: a messaging function, an e-mail function, a push-to-talk function, a telephone function, a private call function, an incident management function, a video streaming function, and the positioning function.

3. The device of claim 1, wherein the electronic communication comprises a playable message, and the threshold time period ends after a given amount of time after the playable message ends playing.

4. The device of claim 1, wherein the controller is further configured to: detect that the button has been activated according to a given pattern, wherein performing the respective function is dependent on the given pattern.

5. The device of claim 1, wherein the controller is further configured to:
   detect that the button has been activated according to a first given pattern or a second given pattern;
   when the button is activated according to the first given pattern, within the threshold time period, perform the respective function according to a first mode, using the source contact; and
   when the button is activated according to the second given pattern, within the threshold time period, perform the respective function according to a second mode, using the source contact.

6. The device of claim 1, further comprising a microphone, wherein the controller is further configured to, when the button is activated after the threshold time period according to a given pattern:
   receive, via the microphone, contact information; and
   perform the respective function using the contact information received via the microphone.

7. The device of claim 1, wherein the controller is further configured to perform the respective functions of any of the one or more buttons using the source contact, when activated within the threshold time period following receipt of the electronic communication.

8. The device of claim 1, further comprising a microphone and a voice activation button, wherein the controller is further configured to, after the threshold time period:
   detect that the voice activation button is activated;
   receive, via the microphone, contact information;
   detect that the button is activated within a further threshold time period; and
   perform the respective function using the contact information received via the microphone.

9. The device of claim 1, further comprising a memory storing a mapping between the one or more buttons and the respective functions.

10. A method comprising:
    receiving, via a communication interface, an electronic communication from a source contact;
    detecting, via a controller, that a button, of one or more buttons, has been activated, each of the one or more buttons mapped to activation of respective functions;
    identifying, via the controller, a respective function mapped to the button, the respective function comprising a positioning function;
    when the button is activated within a threshold time period after receiving the electronic communication, performing, via the controller, the respective function using the source contact from which the electronic communication was received by providing, via the controller, at a display device, one or more of: a location of the source contact and a route to the source contact; and
    when the button is activated after the threshold time period, performing, via the controller, the respective function independent of the source contact by providing, via the controller, at the display device, a current location of a device that includes the controller.

11. The method of claim 10, wherein the respective functions comprise one or more of: a messaging function, an e-mail function, a push-to-talk function, a telephone function, a private call function, an incident management function, a video streaming function, and the positioning function.

12. The method of claim 10, wherein the electronic communication comprises a playable message, and the threshold time period ends after a given amount of time after the playable message ends playing.

13. The method of claim 10, further comprising: detecting, via the controller, that the button has been activated according to a given pattern, wherein performing the respective function is dependent on the given pattern.

14. The method of claim 10, further comprising:
    detecting, via the controller, that the button has been activated according to a first given pattern or a second given pattern;
    when the button is activated according to the first given pattern, within the threshold time period, performing, via the controller, the respective function according to a first mode, using the source contact; and
    when the button is activated according to the second given pattern, within the threshold time period, performing, via the controller, the respective function according to a second mode, using the source contact.

15. The method of claim 10, further comprising, when the button is activated after the threshold time period according to a given pattern:

receiving, at the controller, via a microphone, contact information; and performing, via the controller, the respective function using the contact information received via the microphone.

16. The method of claim 10, further comprising performing the respective functions of any of the one or more buttons using the source contact, when activated within the threshold time period following receipt of the electronic communication.

17. The method of claim 10, further comprising, after the threshold time period:

detecting, via the controller, that a voice activation button is activated;

receiving, at the controller, via a microphone, contact information;

detecting, via the controller, that the button is activated within a further threshold time period; and performing, via the controller, the respective function using the contact information received via the microphone.

18. The method of claim 10, further comprising identifying a respective function mapped to the button using a mapping between the one or more buttons and the respective functions.

19. A device comprising:

a communication interface;

a microphone;

one or more buttons, each mapped to activation of respective functions; and a controller configured to:

receive, via the communication interface, an electronic communication from a source contact;

detect that a button, of the one or more buttons, has been activated;

identify a respective function mapped to the button;

when the button is activated within a threshold time period after receiving the electronic communication, perform the respective function using the source contact from which the electronic communication was received;

when the button is activated after the threshold time period, perform the respective function independent of the source contact; and when the button is activated after the threshold time period according to a given pattern:

receive, via the microphone, contact information; and perform the respective function using the contact information received via the microphone.

20. A method comprising:

receiving, via a communication interface, an electronic communication from a source contact;

detecting, via a controller, that a button, of one or more buttons, has been activated, each of the one or more buttons mapped to activation of respective functions;

identifying, via the controller, a respective function mapped to the button;

when the button is activated within a threshold time period after receiving the electronic communication, performing, via the controller, the respective function using the source contact from which the electronic communication was received;

when the button is activated after the threshold time period, performing, via the controller, the respective function independent of the source contact; and when the button is activated after the threshold time period according to a given pattern:

receiving, at the controller, via a microphone, contact information; and performing, via the controller, the respective function using the contact information received via the microphone.

* * * * *